US012652679B2

(12) United States Patent　　　　　　　　(10) Patent No.:　US 12,652,679 B2

Khoshnevisan et al.　　　　　　　　　　　　(45) Date of Patent:　　　Jun. 9, 2026

(54) TECHNIQUES FOR SRS WITH TD-OCC TRANSMISSION IMPACTED BY DROPPING OF SRS SYMBOLS WITHIN A TIMELINE

(71) Applicant: QUALCOMM Incorporated, San Diego, CA (US)

(72) Inventors: Mostafa Khoshnevisan, San Diego, CA (US); Yitao Chen, San Marcos, CA (US); Xiaoxia Zhang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/482,802

(22) Filed: Oct. 6, 2023

(65) Prior Publication Data

US 2024/0121801 A1　　Apr. 11, 2024

Related U.S. Application Data

(60) Provisional application No. 63/378,938, filed on Oct. 10, 2022.

(51) Int. Cl.
| | |
|---|---|
| *H04W 4/00* | (2018.01) |
| *H04J 13/00* | (2011.01) |
| *H04L 5/00* | (2006.01) |
| *H04W 72/232* | (2023.01) |

(52) U.S. Cl.
CPC ......... *H04W 72/232* (2023.01); *H04J 13/004* (2013.01); *H04L 5/0051* (2013.01)

(58) Field of Classification Search
CPC ............. H04W 72/232; H04W 72/146; H04L 5/0051; H04L 5/0048; H04L 72/2613
See application file for complete search history.

(56) References Cited

U.S. PATENT DOCUMENTS

| | | | | |
|---|---|---|---|---|
| 11,212,800 | B2 * | 12/2021 | Yoo | H04L 27/2613 |
| 2015/0249980 | A1 * | 9/2015 | You | H04W 72/21 |
| | | | | 370/329 |
| 2018/0176907 | A1 * | 6/2018 | You | H04L 1/1861 |
| 2019/0191464 | A1 * | 6/2019 | Loehr | H04W 74/0833 |
| 2020/0008228 | A1 * | 1/2020 | Lee | H04L 5/001 |
| 2023/0018270 | A1 * | 1/2023 | Okamura | H04L 27/2634 |
| 2023/0155765 | A1 * | 5/2023 | Zhang | H04L 5/0048 |
| | | | | 370/329 |
| 2023/0261830 | A1 * | 8/2023 | Iwai | H04W 72/04 |
| | | | | 370/330 |
| 2023/0361960 | A1 * | 11/2023 | Yu | H04L 5/0023 |
| 2024/0121043 | A1 * | 4/2024 | Khoshnevisan | H04L 27/26035 |
| 2024/0250787 | A1 * | 7/2024 | Zhang | H04J 13/0074 |
| 2025/0158771 | A1 * | 5/2025 | Matsumura | H04L 5/0051 |
| 2025/0167955 | A1 * | 5/2025 | Matsumura | H04W 72/04 |
| 2025/0211474 | A1 * | 6/2025 | Chou | H04J 13/18 |

* cited by examiner

*Primary Examiner* — Abdelnabi O Musa

(74) *Attorney, Agent, or Firm* — ArentFox Schiff, LLP

(57) ABSTRACT

Aspects of the present disclosure provide techniques to address the scenarios where some SRS symbols in a timeline have been transmitted prior to other SRS symbols that belong to the same TD-OCC block being dropped. To address such issues when TD-OCC of length X is applied to X symbols of an SRS resource and if detection of a DCI format may result in canceling one or more symbols of the X symbols, the UE may also determine to cancel one or more additional SRS symbols of the X symbols based on a number of considerations provided herein.

30 Claims, 13 Drawing Sheets

N=2, R=1

N=4, R=1

N=4, R=2

Figure 12:
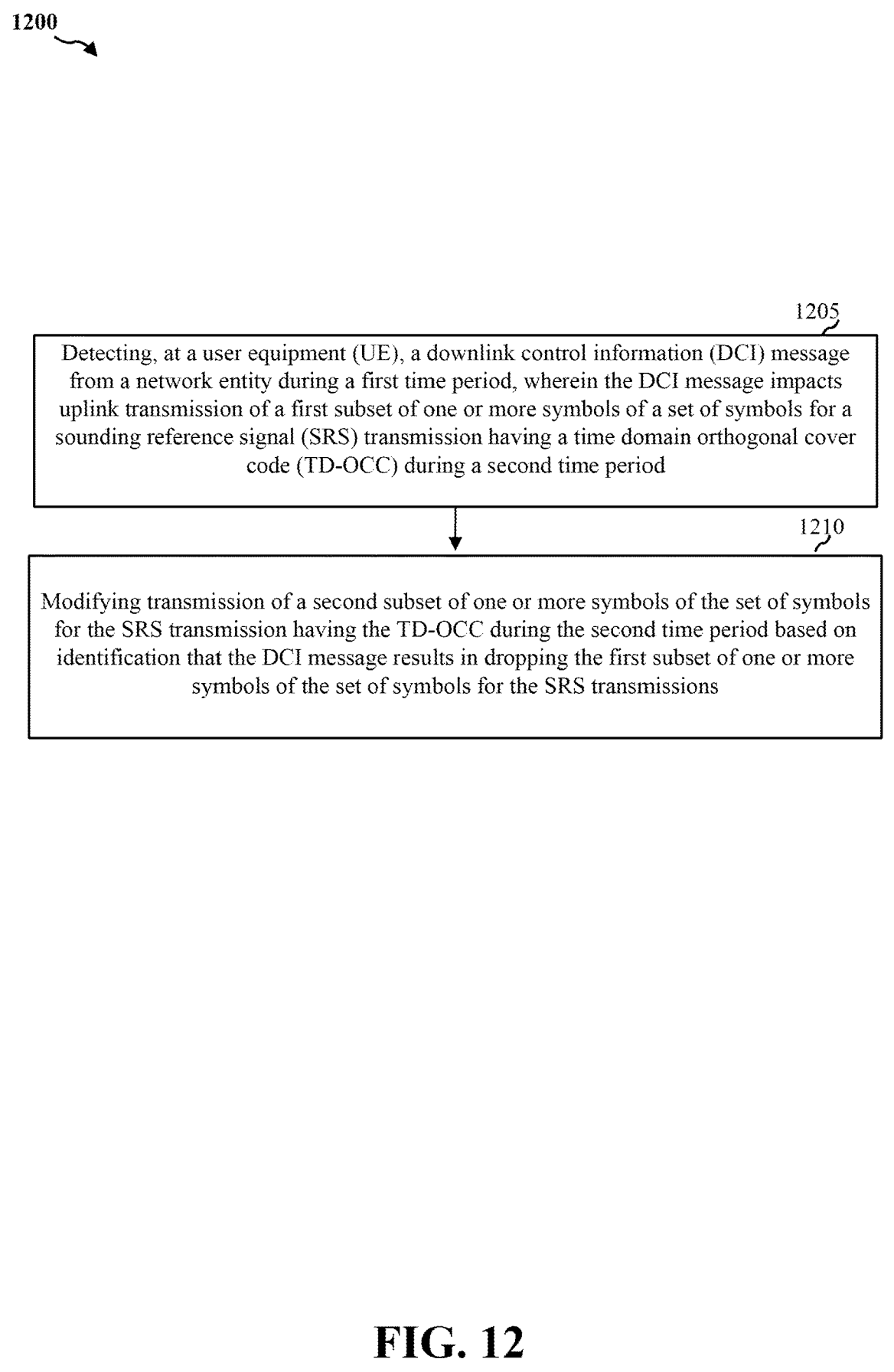

1200

1205

Detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period

1210

Modifying transmission of a second subset of one or more symbols of the set of symbols for the SRS transmission having the TD-OCC during the second time period based on identification that the DCI message results in dropping the first subset of one or more symbols of the set of symbols for the SRS transmissions

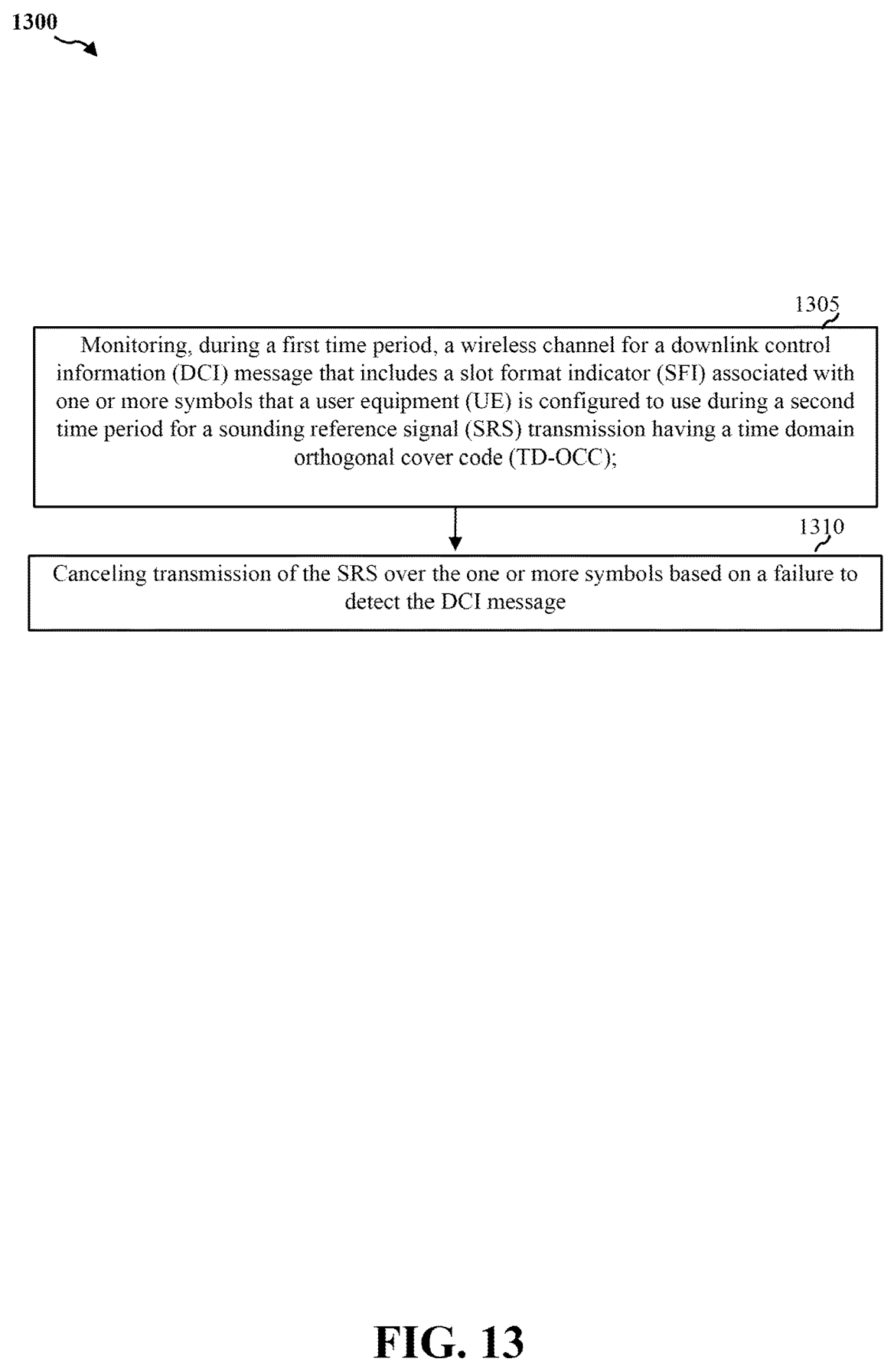

Monitoring, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC);

1310

Canceling transmission of the SRS over the one or more symbols based on a failure to detect the DCI message

FIG. 13

TECHNIQUES FOR SRS WITH TD-OCC TRANSMISSION IMPACTED BY DROPPING OF SRS SYMBOLS WITHIN A TIMELINE

CROSS-REFERENCE TO RELATED APPLICATIONS

This application claims the benefit of U.S. Provisional Application Ser. No. 63/378,938, entitled "TECHNIQUES FOR SRS WITH TD-OCC TRANSMISSION IMPACTED BY DROPPING OF SRS SYMBOLS WITHIN A TIME-LINE" and filed on Oct. 10, 2022, which is expressly incorporated by reference herein in its entirety.

BACKGROUND

Technical Field

The present disclosure relates generally to communication systems, and more particularly, to sounding reference signal (SRS) transmission having a time domain orthogonal cover code (TD-OCC) that drop within a timeline.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, methods, a non-transitory computer-readable mediums, and apparatuses are provided. The method may include detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period. The method may further include modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

In an aspect, the disclosure provides an apparatus for wireless communication. The apparatus may include one or more memories, and one or more processors, individually or in combination, coupled with the one or more memories and configured to detect, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period. The one or more processors, individually or in combination, may further be configured to modify transmission of a second subset of one or more symbols of the set of symbols for the SRS transmission having the TD-OCC during the second time period based on identification that the DCI message results in dropping the first subset of one or more symbols of the set of symbols for the SRS transmissions.

In another aspect, the disclosure provides an apparatus for wireless communication. The apparatus may include means for detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period. The apparatus may include means for modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

In another aspect, the disclosure provides a non-transitory computer-readable medium storing computer executable code. The non-transitory computer-readable medium may include code to detect, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period. The non-transitory computer-readable medium may further include code to modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

In other examples, the method may include monitoring, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC). The method may further include canceling transmission of the SRS over the one or more symbols based on a failure to detect the DCI message.

In an aspect, the disclosure provides an apparatus for wireless communication. The apparatus may include one or more memories, and one or more processors, individually or in combination, coupled with the one or more memories and configured to monitor, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC). The one or more processors, individually or in combination, may be further configured to cancel transmission of the SRS over the one or more symbols based on a failure to detect the DCI message.

In another aspect, the disclosure provides an apparatus for wireless communication. The apparatus may include means for monitoring, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC). The apparatus may further include means for canceling transmission of the SRS over the one or more symbols based on a failure to detect the DCI message.

In another example, the disclosure provides a non-transitory computer-readable medium storing computer executable code. The non-transitory computer-readable medium may include code to monitor, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC). The code may further be executable to cancel transmission of the SRS over the one or more symbols based on a failure to detect the DCI message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a flowchart of an example method of wireless communication according to aspects of the present disclosure.

FIG. 13 is a flowchart of an example method of wireless communication according to aspects of the present disclosure.

DETAILED DESCRIPTION

Figure 1:
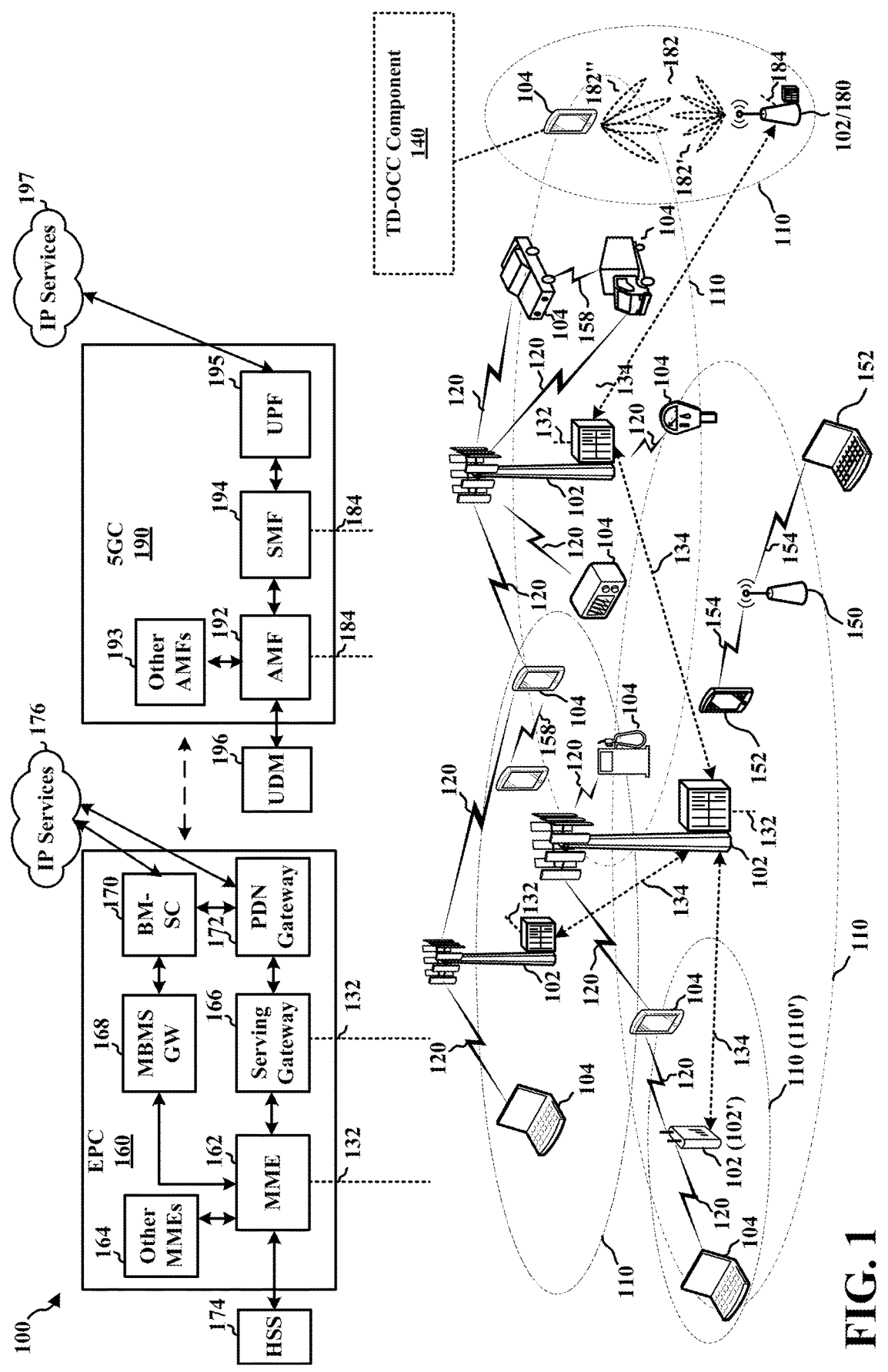
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

In wireless communications systems, sounding reference signals (SRS) is an uplink (UL) reference signal transmitted by the user equipment (UE) in the uplink direction that may be used by a network entity to estimate an uplink channel quality over a bandwidth and/or beam direction. An SRS resource may correspond to one or more SRS ports. Each SRS port may correspond to a UE physical antenna, or a virtual antenna constructed based on an analog, digital, or other operation of the UE physical antennas. Each SRS port may be represented by a port identifier (ID). For an SRS resource associated with multiple SRS ports, different cyclic shifts and/or different comb offsets may be used for SRS transmission from different SRS ports.

In some aspects, the SRS transmission from different SRS ports may be transmitted with a time domain orthogonal cover code (TD-OCC). TD-OCC increases the capacity of SRS as the same cyclic shift and the same comb offset can be used for multiple SRS ports of the SRS resource, or for multiple UEs. In some wireless communication systems without TD-OCC for SRS, when a set of symbols of the SRS resource are dropped, the remaining symbols may still be transmitted. SRS dropping may be performed at a per-symbol level (e.g., whereas PUCCH/PUSCH dropping may not be performed at a per-symbol level). However, when TD-OCC is used to orthogonalize SRS of multiple UEs or multiple ports of the same SRS resource of the same UE, dropping one symbol in an SRS transmission may result in loss of orthogonalization on the remaining symbols in the SRS transmission.

The dropping of the one or more SRS symbols may be due to a number of reasons. For example, the SRS symbols may overlap (in time) with synchronization signal block (SSB) symbols or with the dynamic downlink signals or channels. For example, if the SRS is persistent or semi-persistent traffic on a set of symbols, and downlink control information (DCI) schedules channel state information reference signal (CSI-RS) or data on a physical downlink shared channel (PDSCH) on a subset of symbols, the SRS traffic may be dropped for one or more symbols. The SRS may also be dropped if the SRS symbols overlap (in time) with other uplink channels or signals with higher priority. Additionally or alternatively, the one or more SRS symbols may be dropped if the SRS is indicated to be canceled by uplink cancellation indication (ULCI) (e.g., in DCI format 2_4), or 5) slot format indicator (SFI) related.

An example of overlap in time with dynamic DL signals or channels may be SRS is periodic or semi-persistent (e.g., higher layer configured) on a set of symbols where downlink control information (DCI) may schedule CSI-RS or PDSCH on a subset of the set of symbols. An example of overlap in time with other UL signals or channels with a higher priority may be overlapping with PUSCH. If SRS overlaps with PUCCH, SRS is dropped unless the SRS is aperiodic SRS triggered to be transmitted to overlap in the same symbol with PUCCH carrying semi-persistent/periodic CSI report(s) or semi-persistent/periodic layer 1 (L1) reference signal received power (RSRP) report(s) or L1 signal to interference and noise (SINR) report(s). In some aspects, when different SRS resources overlap, SRS with higher priority may be transmitted and SRS with lower priority may be dropped. As an example, aperiodic (AP) SRS may have higher priority than semi-persistent (SP) SRS, and semi-persistent SRS may have higher priority than periodic (P) SRS. In some aspects, SFI related dropping may apply when UE is configured to monitor DCI format 2_0 for dynamic SFI indication. If P/SP SRS is configured in a set of symbols, and dynamic SFI indicates "flexible" or "DL" on those symbols, SRS may be dropped. If P/SP SRS is configured in a set of symbols that are flexible as indicated by higher layers, a UE may be configured to monitor DCI format 2_0 (dynamic SFI) but the UE may not detect the DCI format 2_0.

In some aspects, when one or more SRS symbols are dropped, the UE may further determine between dropping or transmitting the remaining symbols of the SRS transmission at. In some aspects, when TD-OCC of length X is applied to X symbols of an SRS resource, if a UE drops one or more SRS symbols, the UE may determine one of the following behaviors for the remaining of the SRS symbols: 1) Drop the remaining of the SRS symbols, 2) transmit the remaining of the SRS symbols using the original configured parameters (e.g., cyclic shift or comb offset), or 3) transmit the remaining of the SRS symbols using a different set of SRS parameters (e.g., cyclic shift or comb offset) in response to dropping the one or more symbols.

In some aspects, if the UE transmits the remaining of the X symbols using a different set of SRS parameters (e.g., cyclic shift or comb offset) in response to dropping the one or more symbols, the different set of SRS parameters may be changed based on: 1) transmit a subset of ports and not transmit the other ports, or 2) change the cyclic shift or comb offset only for a subset of ports and use the original configured cyclic shift/comb offset for the other ports. In some aspects, when different TD-OCC sequences is used within the ports of the same SRS resource (where the different TD-OCC sequences have the same cyclic shift and comb offset), the UE may transmit the remaining of the X number of SRS symbols using a different set of SRS parameters (e.g., cyclic shift or comb offset) in response to dropping the one or more symbols. In some aspects, because the orthogonality given by TD-OCC between ports is lost due to dropping the one or more symbols, either one port may not be transmitted or one port may use a different comb offset or cyclic shift. In some aspects, the different set of SRS parameters may be changed based on not applying TD-OCC in the remaining of the X number of SRS symbols because the TD-OCC with the original length may not be used.

However, even with a modified techniques to address the SRS symbol droppings, one consideration that fails to be addressed is the impact of SRS symbol droppings during a timeline. For example, if a dynamic event (e.g., detection of a DCI format) results in cancelation of dropping of one or more SRS symbols within a block of X symbols that apply a TD-OCC sequence of length X, there is still at least one or more SRS symbols (within the block of X symbols) that may be present before (in time) the one or more SRS symbols that are indicated to be dropped or canceled by the DCI format. In such instance, the UE may transmit one or more SRS symbols prior to the UE recognizing that one or more later in time SRS symbols may need to be dropped (e.g., due to DCI detection that results in cancellation of some SRS symbols).

Aspects of the present disclosure provide techniques to address the scenarios where some SRS symbols in a timeline have been transmitted prior to other SRS symbols that belong to the same TD-OCC block being dropped. To address such issues when TD-OCC of length X is applied to X number of symbols of an SRS resource and if detection of a DCI format may result in canceling one or more symbols of the X symbols, the UE may also determine to cancel one or more additional SRS symbols of the X symbols based on a number of considerations provided herein.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

FIG. 1 is a diagram illustrating an example of a wireless communications system and an access network 100 in which limits for blind decoding of a search space are implemented. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

In some aspects, the UE 104 may include a TD-OCC component 198. The TD-OCC component 198 may be configured to drop one or more symbols of a set of symbols for an SRS transmission having a TD-OCC, the SRS transmission including a cyclic shift and a comb offset. In some aspects, the TD-OCC component 198 may be further configured to determine to drop or transmit remaining symbols of the SRS transmission. For example, the TD-OCC component 140 may resolve scenarios when TD-OCC of length X is applied to X number of symbols of an SRS source and detection of a DCI format results in canceling first one or more symbols of the X symbols of SRS symbols. In such instance, the TD-OCC component 140 may determine whether to cancel a second one or more symbols of the X symbols in accordance with various aspects of the present disclosure.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
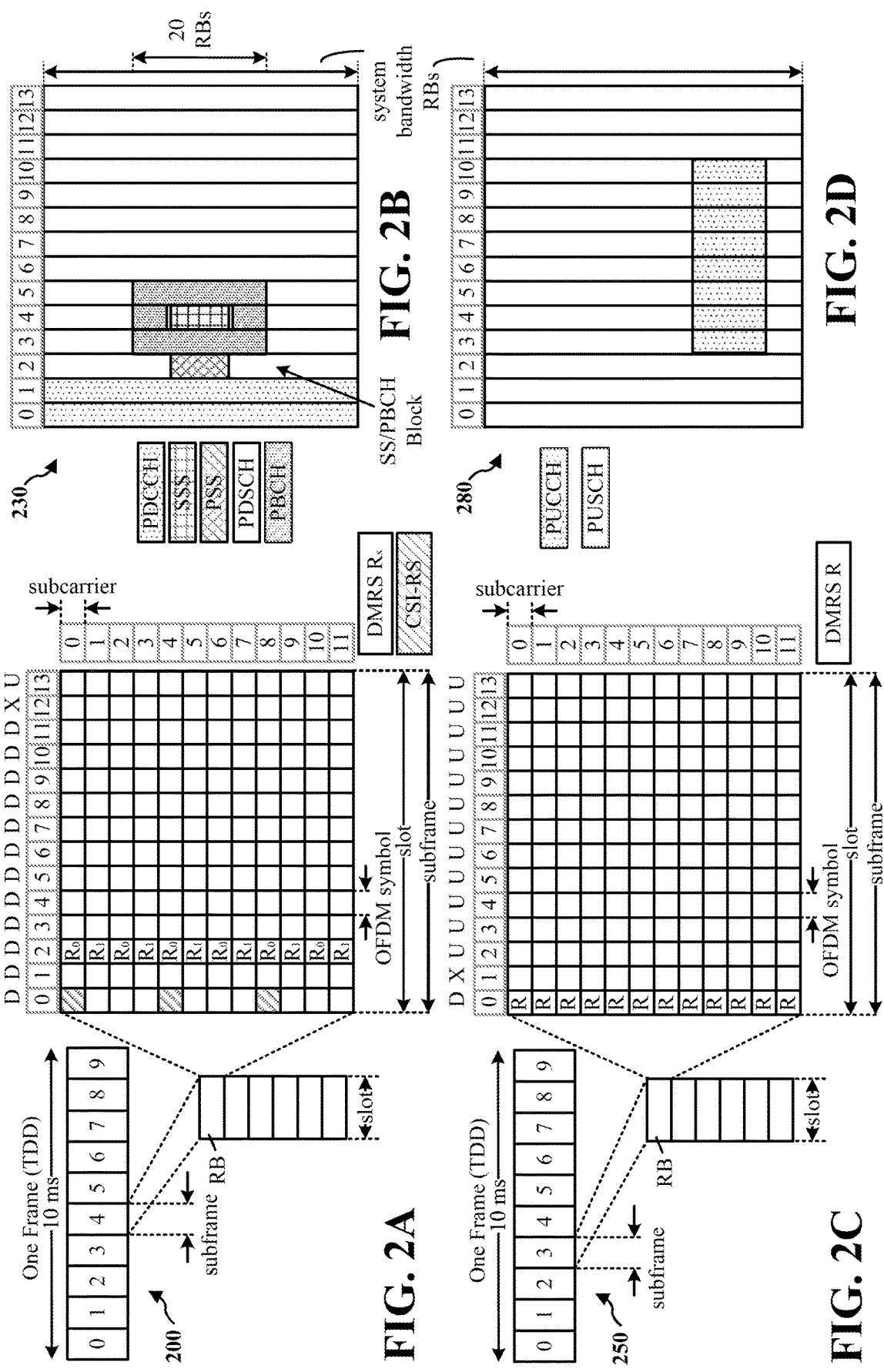
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a UL channels within a subframe.

FIGS. 2A-2D are resource diagrams illustrating example frame structures and resources that may be used by communications between the UE 104 and the base station 102 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
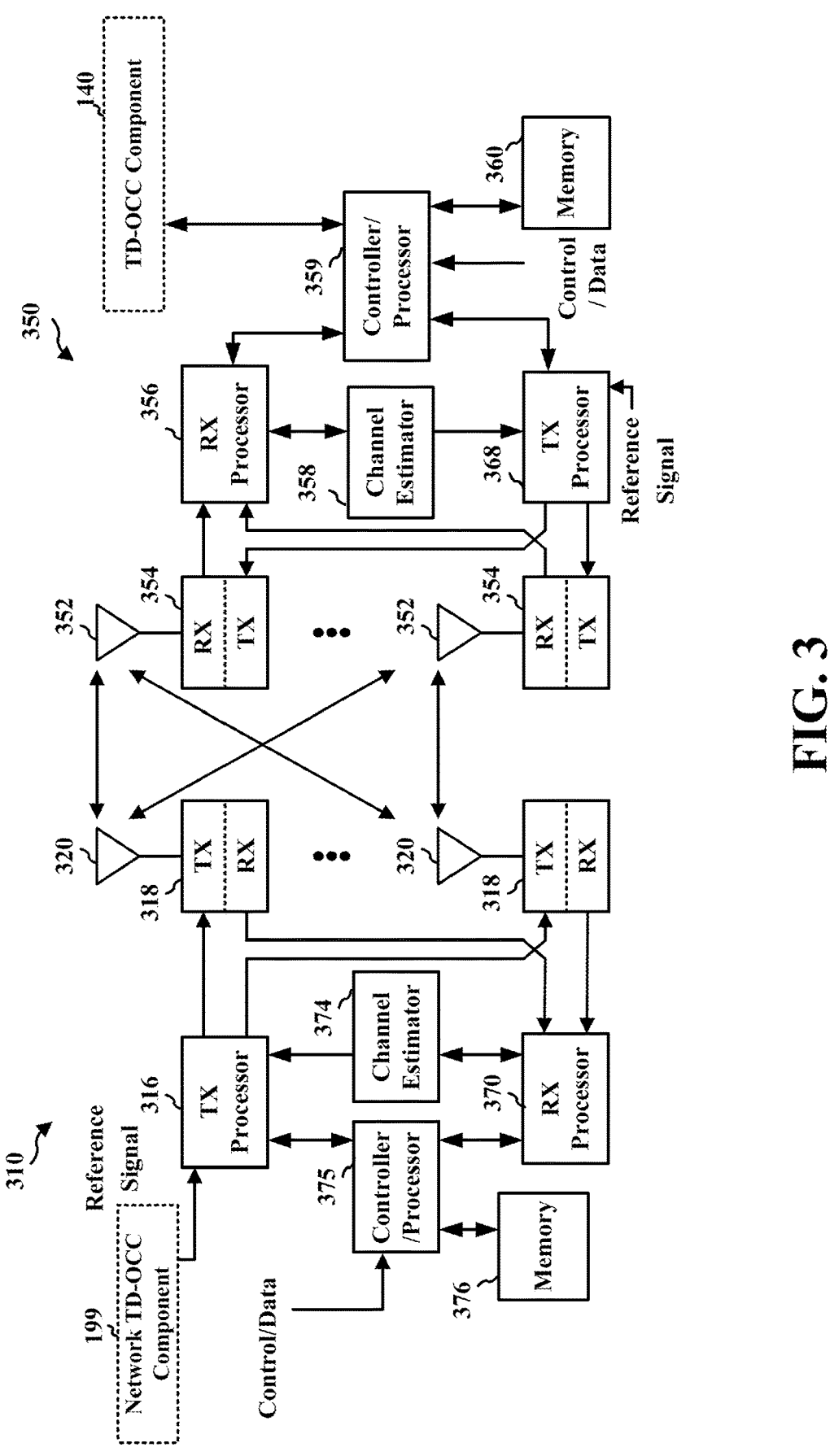
FIG. 3 is a diagram illustrating an example of a base station and user equipment (UE) in an access network.

FIG. 3 is a diagram of a base station 310 in communication with a UE 350. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), resegmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points trans-mitted by the base station 310. These soft decisions may be based on channel estimates computed by the channel esti-mator 358. The soft decisions are then decoded and deinter-leaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer func-tionality associated with header compression/decompres-sion, and security (ciphering, deciphering, integrity protec-tion, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical chan-nels and transport channels, multiplexing of MAC SDUs onto TBs, demultiplexing of MAC SDUs from TBs, sched-uling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each trans-mitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, con-trol signal processing to recover IP packets from the UE 350. IP packets from the controller/processor 375 may be pro-vided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with TD-OCC component 198 of FIG. 1.

At least one of the TX processor 316, the RX processor 370, and the controller/processor 375 may be configured to perform aspects in connection with network entity TD-OCC component 199 of FIG. 1.

SRS is a UL reference signal transmitted by the UE in the uplink direction that may be used by a network entity to estimate an uplink channel quality over a bandwidth and/or beam direction. The UE may transmit the SRS based on a configuration received from the network. The network may then measure the SRS transmissions to estimate a channel quality. The SRS configuration may include various infor-mation, such as a comb spacing, a comb offset, timing information, etc.

Figure 4:
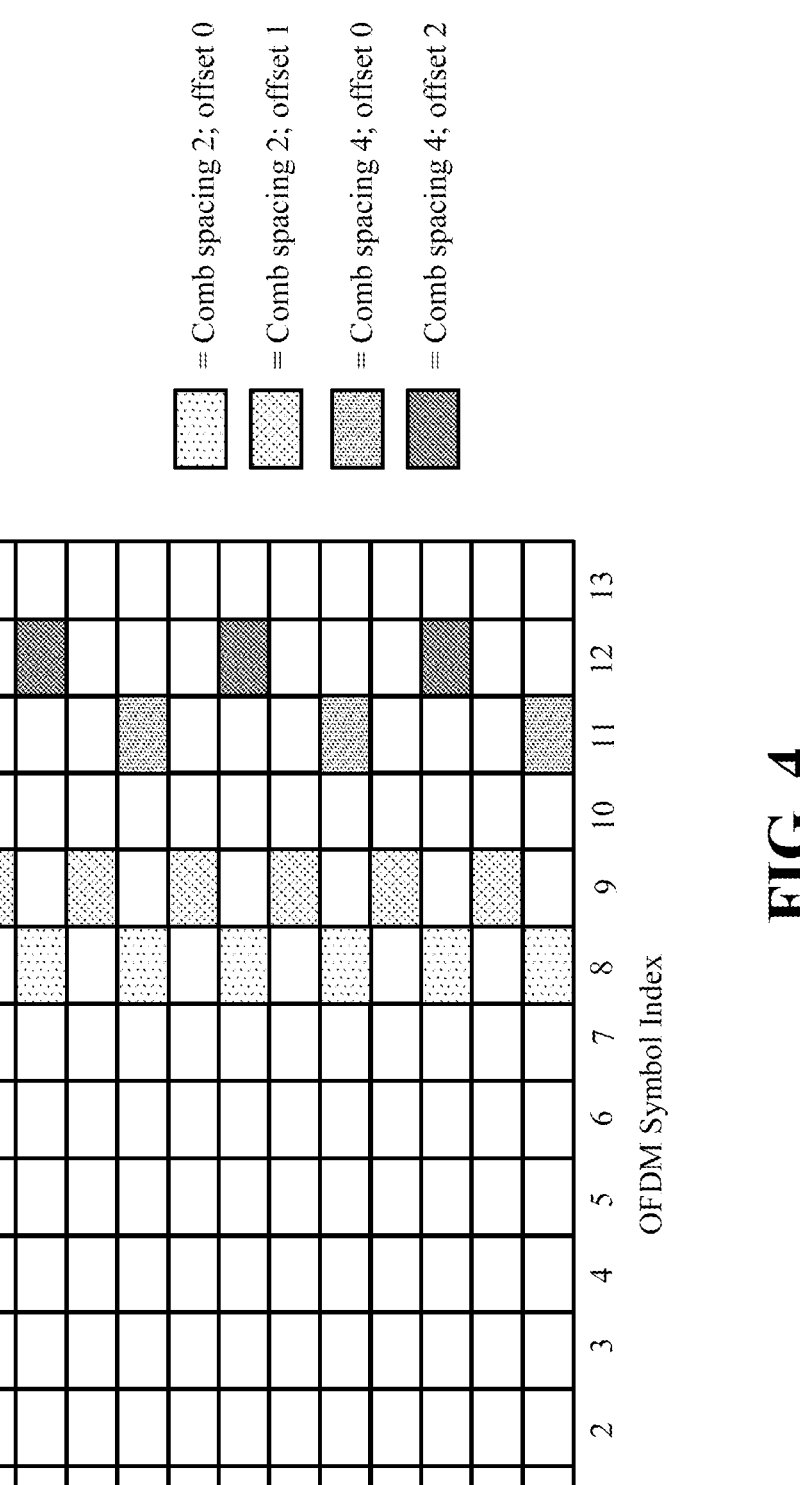
FIG. 4 is a diagram illustrating an example of comb spacing and comb offset.

As an example, the comb spacing configured for the SRS may indicate a frequency comb spacing between SRS REs in a symbol. For example, the comb spacing ($K_{TC}$) for the SRS may be configured as 2, 4, or 8 per SRS resource. As an example, a comb spacing of 2 corresponds to a spacing between two SRS REs in an OFDM symbol. A comb spacing of 4 corresponds to a spacing of 4 REs between SRS resources, and a comb spacing of 8 corresponds to 8 REs between SRS resources. FIG. 4 illustrates a resource dia-gram 400 in time and frequency. In FIG. 4, the SRS in symbol index 8 and symbol index 9 have a comb spacing of 2, whereas the SRS in symbol indexes 11 and 12 have a comb spacing of 4. The comb offset may be indicative of a location of SRS RE, e.g., relative to a starting RE or reference RE. For example, the comb offset ($\bar{K}_{TC}$) for the SRS may be configured as 0, 1, . . . , $K_{TC}$–1 per SRS resource, which indicates the SRS REs (e.g., by indicating a starting RE, and the SRS transmission may occupy every $K_{TC}$ REs within the sounding BW once starting RE is determined). The diagram 400 in FIG. 4 illustrates example aspects of combinations of comb spacing and comb offset. The SRS in symbol index 8 and 11 have an offset of 0, e.g., and have a starting RE that corresponds to subcarrier index 0, or a reference subcarrier within a bandwidth that the SRS is configured to be transmitted. The SRS in symbol index 9 has a comb offset of 1, e.g., and starts in subcarrier index 1, e.g., with an offset of 1 RE or subcarrier from the reference subcarrier. The SRS in symbol index 12 has an offset of 2, and is offset from subcarrier index 0 by 2 REs. The SRS configuration may indicate a number of symbols in which the SRS is to be transmitted, and may indicate a number of repetitions for the SRS. Each SRS resource that the UE uses for transmission of the SRS and the base station uses for reception of the SRS may be configured with N OFDM symbols and R repetitions, N and R being positive integer numbers. If R<N, there are N/R frequency hops within the SRS resource.

Figures 5A, 5B, 5C:
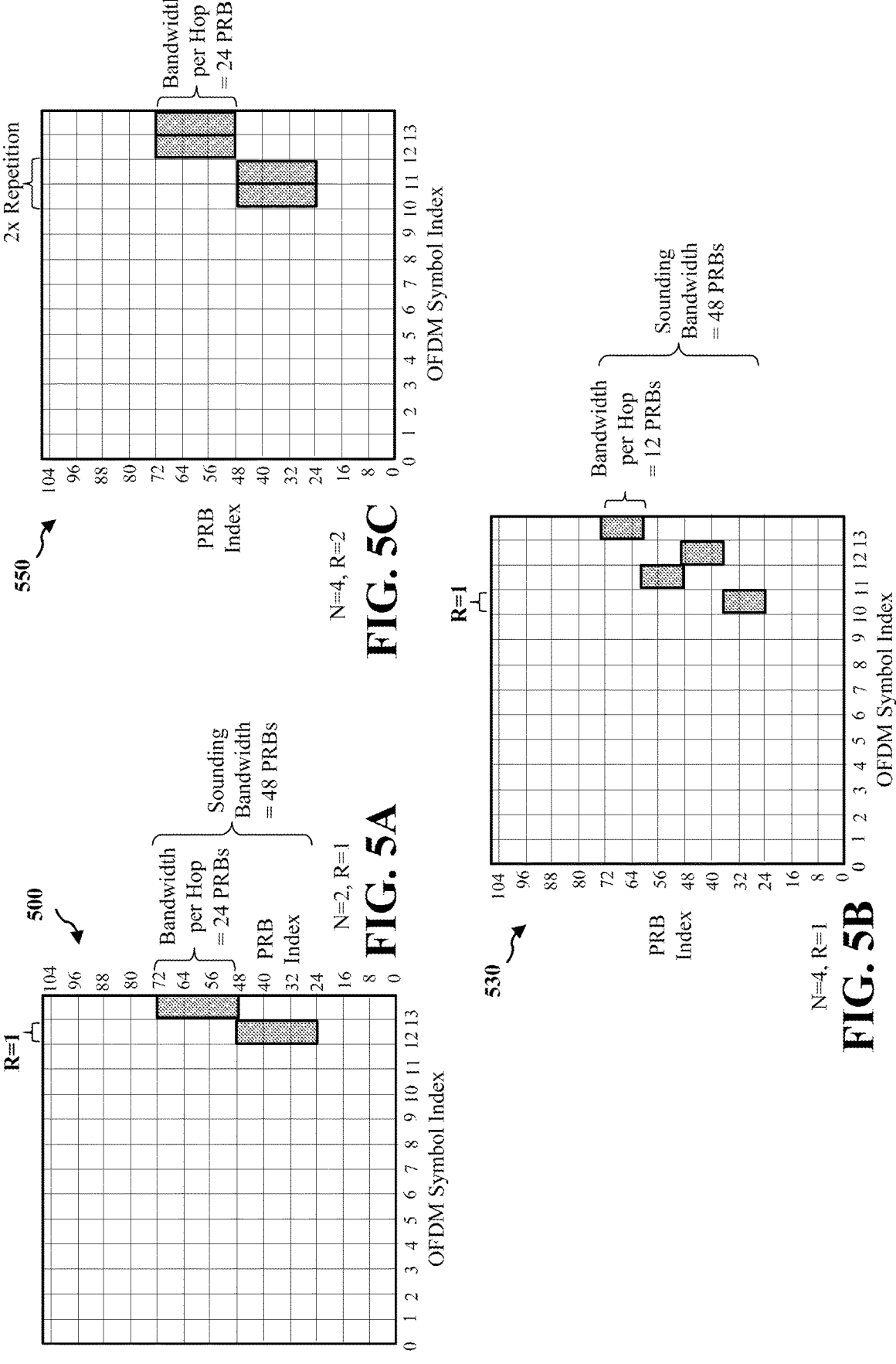
FIG. 5A is a diagram illustrating an example of frequency hopping and repetition.
FIG. 5B is a diagram illustrating an example of frequency hopping and repetition.
FIG. 5C is a diagram illustrating an example of frequency hopping and repetition.

FIG. 5A is a diagram 500 illustrating an example of frequency hopping and repetition for SRS transmission. As illustrated in FIG. 5A, the sounding bandwidth associated with the SRS may be 48 PRBs, and a bandwidth per hop may be 24 PRBs. FIG. 5A illustrates an example of 2 frequency hops in this example. FIG. 5A illustrates an example in which the SRS may be configured for 2 OFDM symbols (e.g., N=2) with 1 repetition (e.g., r=1). FIG. 5B is a diagram 530 illustrating another example of frequency hopping and repetition. As illustrated in FIG. 5B, the sounding bandwidth associated with the SRS may be 48 PRBs, and a bandwidth per hop may be 12 PRBs. FIG. 5B illustrates an example of 4 hops, for an SRS configuration for 4 OFDM symbols (e.g., N=4) with 1 repetition (e.g., R=1). FIG. 5C is a diagram 550 illustrating another example of frequency hopping and repetition. As illustrated in FIG. 5C, the sounding bandwidth associated with the SRS may be 48 PRBs, and a bandwidth per hop may be 24 PRBs. FIG. 5C illustrates an example of 2 hops with 2 repetitions (e.g., R=2) for each hop over 4 OFDM symbols (e.g., N=4).

A set of time and frequency resources that may be used for one or more transmissions of SRS may be referred to as an "SRS resource set". In some communication systems, the SRS resource set applicability for an SRS resource set may be configured by a higher layer parameter, such as "usage" associated with the SRS resource set, such as in the SRS-ResourceSet parameter. For example, usage may be configured as one of beam management, codebook, non-codebook, antenna switching, or the like. Each SRS resource set may be configured with one or more (such as up to 16) SRS resources. Each SRS resource set may be aperiodic, semi-persistent, or periodic.

In some wireless communication systems, two types of PUSCH transmissions may be supported. The first type may be referred to as codebook based transmission. For codebook based transmission, a UE may be configured with one SRS resource set with "usage" set to "codebook". For example, a maximum of 4 SRS resources within the set may be configured for the UE. Each SRS resource may be radio resource control (RRC) configured with a number of ports, such as one or more ports. The SRS resource indicator (SRI) field in the UL DCI scheduling the PUSCH may indicate one SRS resource. The number of ports configured for the indicated SRS resource may determine number of antenna ports for the PUSCH. The PUSCH may be transmitted with the same spatial domain filter (which may be otherwise referred to as a "beam") as the indicated SRS resources. The number of layers (i.e., rank) or transmitted precoding matrix indicator (TPMI) (e.g., for precoder) for the scheduled PUSCH may be determined from a separate DCI field "Precoding information and number of layers".

For non-codebook-based transmission, a UE may be configured with one SRS resource set with "usage" set to "non-codebook". For example, a maximum of 4 SRS resources within the set may be configured for the UE. Each SRS resource may be RRC configured with one port. The SRI field in the UL DCI scheduling the PUSCH may indicate one or more SRS resources. A number of indicated SRS resources may determine the rank (e.g., number of layers) for the scheduled PUSCH. The PUSCH may be transmitted with the same precoder as well as a same spatial domain filter (e.g., beam) as the indicated SRS resources.

An SRS resource may correspond to one or more SRS ports. Each SRS port may correspond to an actual UE physical antenna, or a virtual antenna constructed based on an analog, digital, or other operation of the UE physical antennas. Each SRS port may be represented by a port identifier (ID). For an SRS resource associated with multiple SRS ports, different cyclic shifts and/or different comb offsets may be used for SRS transmission from different SRS ports. As used herein, the term "cyclic shift" may refer to a bitwise operation of moving one or more bits at an end to a beginning and shifting other entries to later positions. As an example, in each symbol, a set of SRS ports may be sounded either via different subcarriers, or in overlapping subcarriers with different cyclic shifts and different comb offsets.

Figure 6:
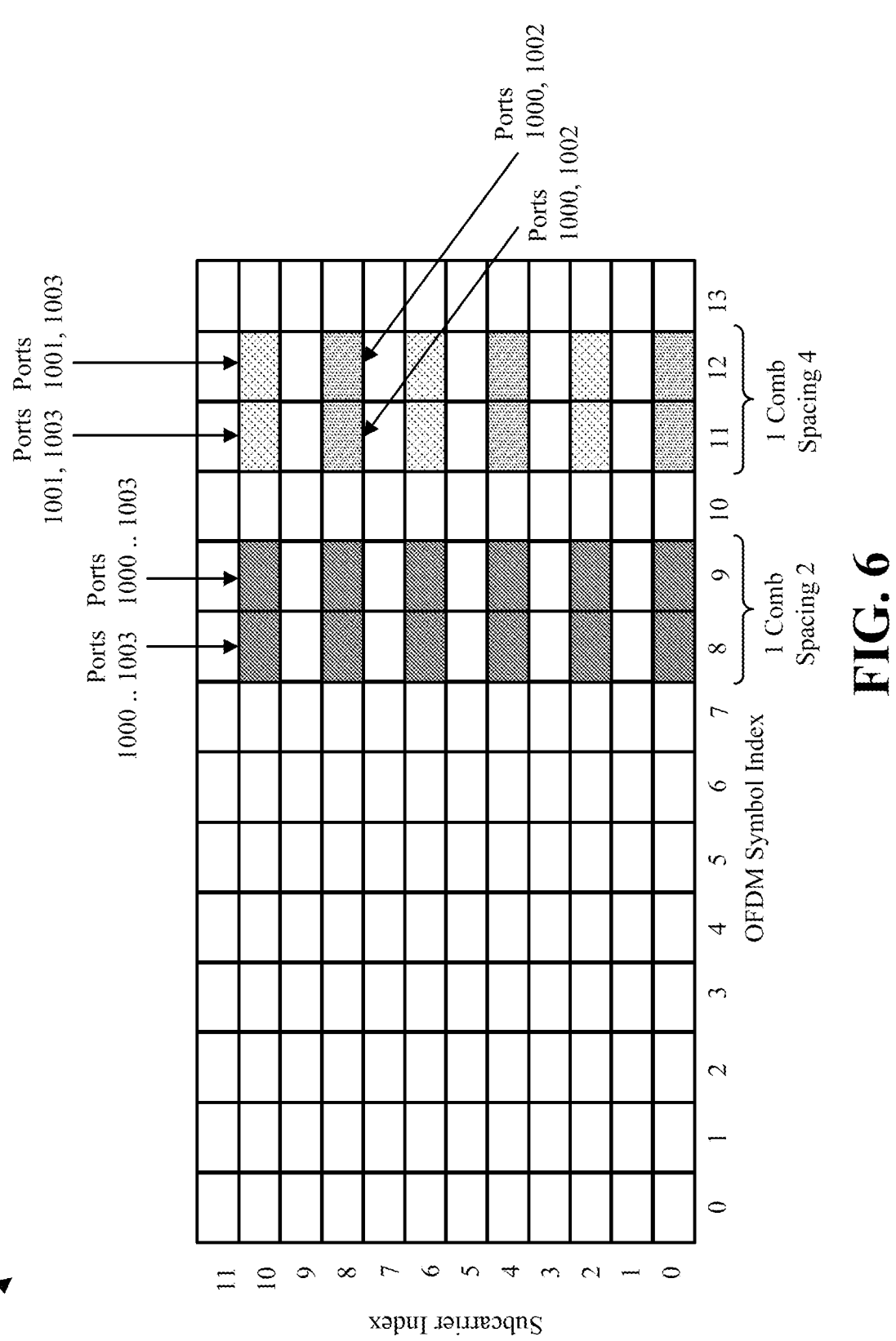
FIG. 6 is a diagram illustrating an example of multiplexing of different SRS ports.

FIG. 6 is a diagram 600 illustrating an example of multiplexing of SRS transmissions from different SRS ports of a UE. As illustrated in FIG. 6, in a first example, with N=2 symbols and R=2 repetitions, 4 SRS ports (e.g., SRS ports 1000, 1001, 1002, and 1003) are sounded (e.g., an SRS transmission is transmitted from the 4 SRS ports of the UE in each SRS symbol) in the same two SRS symbols (e.g., symbol indexes 8 and 9) and with the same comb spacing and comb offset (e.g., on the same REs) using four different cyclic shifts. For example, the SRS transmission is transmitted from a first SRS port with a first cyclic shift, from a second SRS port with a second cyclic shift, from a third SRS port with a third cyclic shift, and from a fourth SRS port with a fourth cyclic shift. In a second example, N=2 symbols, and R=2 repetitions, 4 SRS ports (e.g., SRS ports 1000, 1001, 1002, and 1003) are sounded in each SRS symbol, e.g., in symbol indexes 11 and 12, with two different cyclic shifts and two different comb offsets. For example, the UE transmits SRS transmissions from SRS ports 1001 and 1003 with a comb spacing of 4 and a comb offset of 2, e.g., using a first cyclic shift for the SRS transmission from SRS port 1001 and a second cyclic shift for the SRS transmission from SRS port 1003. The UE also transmits SRS transmissions from SRS ports 1000 and 1002 with a comb spacing of 4 and a comb offset of 0, using different cyclic shifts for the SRS transmissions from the SRS ports 1000 and 1002. For an SRS resource associated with multiple SRS ports, cyclic shifts may be evenly distributed among the ports, where the cyclic shift of the first port is RRC-configured $$(n_{SRS}^{cs})$$

for the SRS resource.

In some aspects, the SRS transmission from different SRS ports may be transmitted with a TD-OCC. For example, the UE may transmit the SRS in two different REs that are on the same subcarrier but different symbols, and the two SRS ports may be code division multiplexed (CDMed) using an OCC of $\{1,1\}$ and $\{1,-1\}$. That is, in the first RE, p1+p2 may be transmitted, and in the $2^{nd}$ RE, p1-p2 may be transmitted, where p1 represents the SRS of first port and p2 represents the SRS of the second port. In another example, for 4 SRS ports, a 4 port TD-OCC=$\{\{1,1,1,1\}, \{1,-1,1,-1\},\{1,1,-1,-1\}, \{1,-1,-1,1\}\}$ can be used: p1+p2+p3+p4 on the first symbol, p1−p2+p3−p4 on the second symbol, p1+p2−p3−p4 on the third symbol, p1−p2−p3+p4 on the fourth symbol, where p3 represents the SRS for the third port and p2 represents the SRS for the fourth port. For a TD-OCC of length X, where X is a power of 2 (2, 4, 8, . . . ), orthogonal codes such as Walsh codes of length X may be used across X symbols.

Walsh code may be orthogonal codes where all the members in the set are orthogonal to each other. Other codebooks such as DFT-based or e.g., $\{1, j, 1, j\}$, $\{1, -j, 1, -j\}$ may be also used for TD-OCC. TD-OCC can be also used across different UEs, or across different ports of a UE and across different UEs. As an example, a first UE (UE1) may be configured with an SRS resource for 2 SRS ports using a TD-OCC of $\{1,1,1,1\}$ and $\{1,-1,1,-1\}$ across 4 OFDM symbols. A second UE (UE2) may be configured with an SRS resource with 2 ports using a TD-OCC of $\{1,1,-1,-1\}$ and $\{1,-1,-1,1\}$ across 4 OFDM symbols. Table 1 below shows an example configuration of the first UE and the second UE:

TABLE 1

|  | Symbol 1 | Symbol 2 | Symbol 3 | Symbol 4 |
|---|---|---|---|---|
| First SRS port of UE1 | 1 | 1 | 1 | 1 |
| Second SRS port of UE1 | 1 | −1 | 1 | −1 |
| First SRS port of UE2 | 1 | 1 | −1 | −1 |
| Second SRS port of UE2 | 1 | −1 | −1 | 1 |

As the same cyclic shift and the same comb offset may be used for multiple SRS ports of the SRS resource or for multiple UEs, the overall capacity for the SRS sounding of multiple SRS ports (e.g., and overlapping SRS sounding of different UEs) may be increased. In some wireless communication systems without TD-OCC for SRS, when a set of symbols of the SRS resource are dropped, the remaining symbols may still be transmitted. SRS dropping may be performed at a per-symbol level (e.g., whereas PUCCH/PUSCH dropping may not be performed at a per-symbol level). However, when TD-OCC is used to orthogonalize SRS of multiple UEs or multiple ports of the same SRS resource of the same UE, dropping one symbol in an SRS transmission may result in loss of orthogonalization on the remaining symbols in the SRS transmission. For example, if two UEs use TD-OCC sequences of [+1,+1] and [+1,−1] over two OFDM symbols (using the same comb offset and cyclic shift), if the first symbol of the first UE is dropped, the two SRS on the second symbol may experience large interference as [0,+1] and [+1,−1] are no longer orthogonal. Dropping the remaining symbols within the TD-OCC if at least one symbol is dropped may avoid the interference, but may be inefficient.

In some aspects, when one or more SRS symbols are dropped, the UE may further determine between dropping or transmitting the remaining symbols of the SRS transmission at. In some aspects, when TD-OCC of length X is applied to X symbols of an SRS resource, if a UE drops one or more SRS symbols, the UE may determine one of the following behaviors for the remaining of the SRS symbols: 1) Drop the remaining of the SRS symbols, 2) transmit the remaining of the SRS symbols using the original configured parameters (e.g., cyclic shift or comb offset), or 3) transmit the remaining of the SRS symbols using a different set of SRS parameters (e.g., cyclic shift or comb offset) in response to dropping the one or more symbols.

In some aspects, if the UE transmits the remaining of the X number of SRS symbols using a different set of SRS parameters (e.g., cyclic shift or comb offset) in response to dropping the one or more symbols, the different set of SRS parameters may be changed based on: 1) transmit a subset of ports and not transmit the other ports, or 2) change the cyclic shift or comb offset only for a subset of ports and use the original configured cyclic shift/comb offset for the other ports. In some aspects, when different TD-OCC sequences is used within the ports of the same SRS resource (where the different TD-OCC sequences have the same cyclic shift and comb offset), the UE may transmit the remaining of the X symbols using a different set of SRS parameters (e.g., cyclic shift or comb offset) in response to dropping the one or more symbols. In some aspects, because the orthogonality given by TD-OCC between ports is lost due to dropping the one or more symbols, either one port may not be transmitted or one port may use a different comb offset or cyclic shift. In some aspects, the different set of SRS parameters may be changed based on not applying TD-OCC in the remaining of the X symbols because the TD-OCC with the original length may not be used.

However, even with a modified techniques to address the SRS symbol droppings, one consideration that fails to be addressed is the impact of SRS symbol droppings during a timeline. For example, if a dynamic event (e.g., detection of a DCI format) results in cancelation of dropping of one or more SRS symbols within a block of X symbols that apply a TD-OCC sequence of length X, there is still at least one or more SRS symbols (within the block of X symbols) that may be present before (in time) the one or more SRS symbols that are indicated to be dropped or canceled by the DCI format. In such instance, the UE may transmit one or more SRS symbols prior to the UE recognizing that one or more later in time SRS symbols may need to be dropped (e.g., due to DCI detection that results in cancellation of some SRS symbols).

Aspects of the present disclosure provide techniques to address the scenarios where some SRS symbols in a timeline have been transmitted prior to other SRS symbols that belong to the same TD-OCC block being dropped. To address such issues when TD-OCC of length X is applied to X symbols of an SRS resource and if detection of a DCI format may result in canceling one or more symbols of the X symbols, the UE may also determine to cancel one or more additional SRS symbols of the X symbols based on a number of considerations provided herein.

Figure 7:
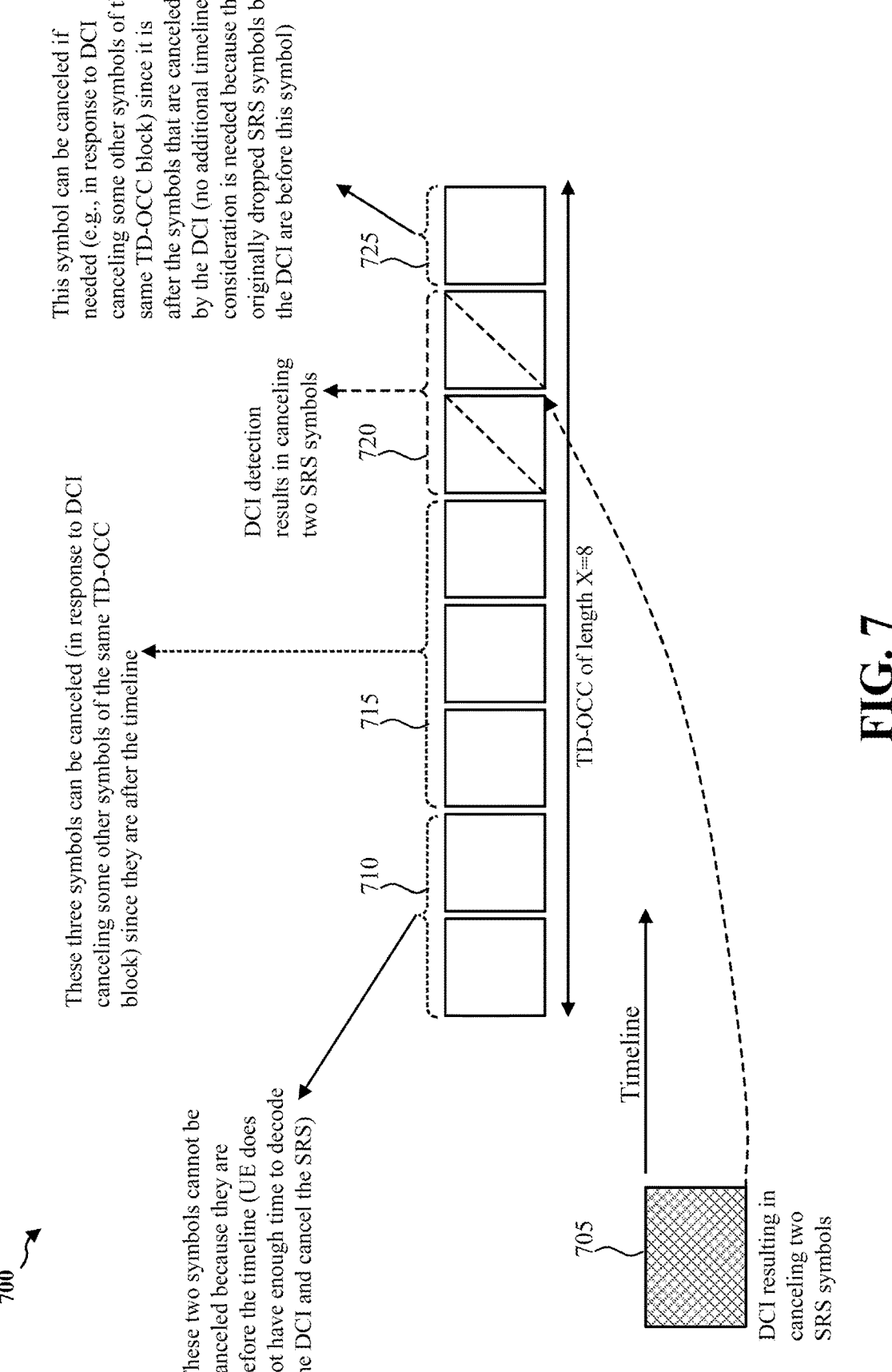
FIG. 7 is an example of timeline that illustrates a UE receiving a DCI at a first time period that may result in cancellation of one or more SRS symbols from the TD-OCC SRS symbols.

FIG. 7 is an example of a timeline 700 that illustrates a UE 104 receiving a DCI 705 at a first time period prior to the start of transmission of TD-OCC SRS symbols of length X (e.g., 8 symbols). The DCI 705 may be an example of DCI format that can perform one or more of: (1) schedule a PDSCH or CSI-RS on the first one or more symbols, (2) schedule PUCCH on the first one or more symbols, (3) UL cancelation DCI format (DCI format 2_4) that indicates the first one or more symbols to be canceled, (4) schedules AP-SRS on the first one or more symbols, (5), schedules PUSCH with high priority (priority 1) on the first one or more symbols, or (6) an SFI DCI format (DCI format 2_0) that indicates the first one or more symbols as "flexible" or "DL." And while FIG. 7 timeline shows one example, it should be appreciated that the aspects of the present disclosure are not limited to the specific example and scenario discussed in the examples of FIG. 7 (or FIGS. 8-11), but generally address scenarios where an event (e.g., DCI) may impact transmission of one or more SRS symbols in TD-OCC for the UE.

Thus, in the illustrated example, the DCI 705, as one example, may result in cancellation of one or more SRS symbols 720 within the TD-OCC at a later time period. However, because of the time that may be needed for the UE 104 to decode the DCI 705 signal, the UE 104 may not recognize that any of the one or more SRS symbols from the TD-OCC may be canceled until the UE 104 has already transmitted at least one or more first SRS symbols 710 to the network entity. Thus, in some instances, even when the DCI 705 may cancel at least one or more SRS symbols 720, the UE 104 may be unable to prevent at least some SRS symbols (e.g., first one or more SRS symbols 710 from being transmitted).

However, during some portion of the timeline (e.g., by the second symbol in the timeline of the illustrated example), the UE 104 may recognize that at least one or more SRS symbols 720 later in the time period may be impacted due to the DCI 705. Thus, at that instance in time, for example, the UE 104 may determine whether or not to transmit at least a second set of SRS symbols, including the first candidate of SRS symbols 715 for cancellation that precede and a second candidate of SRS symbols 725 that follow the SRS symbols 720 that the UE 104 recognizes would be canceled due to the DCI.

Figure 8:
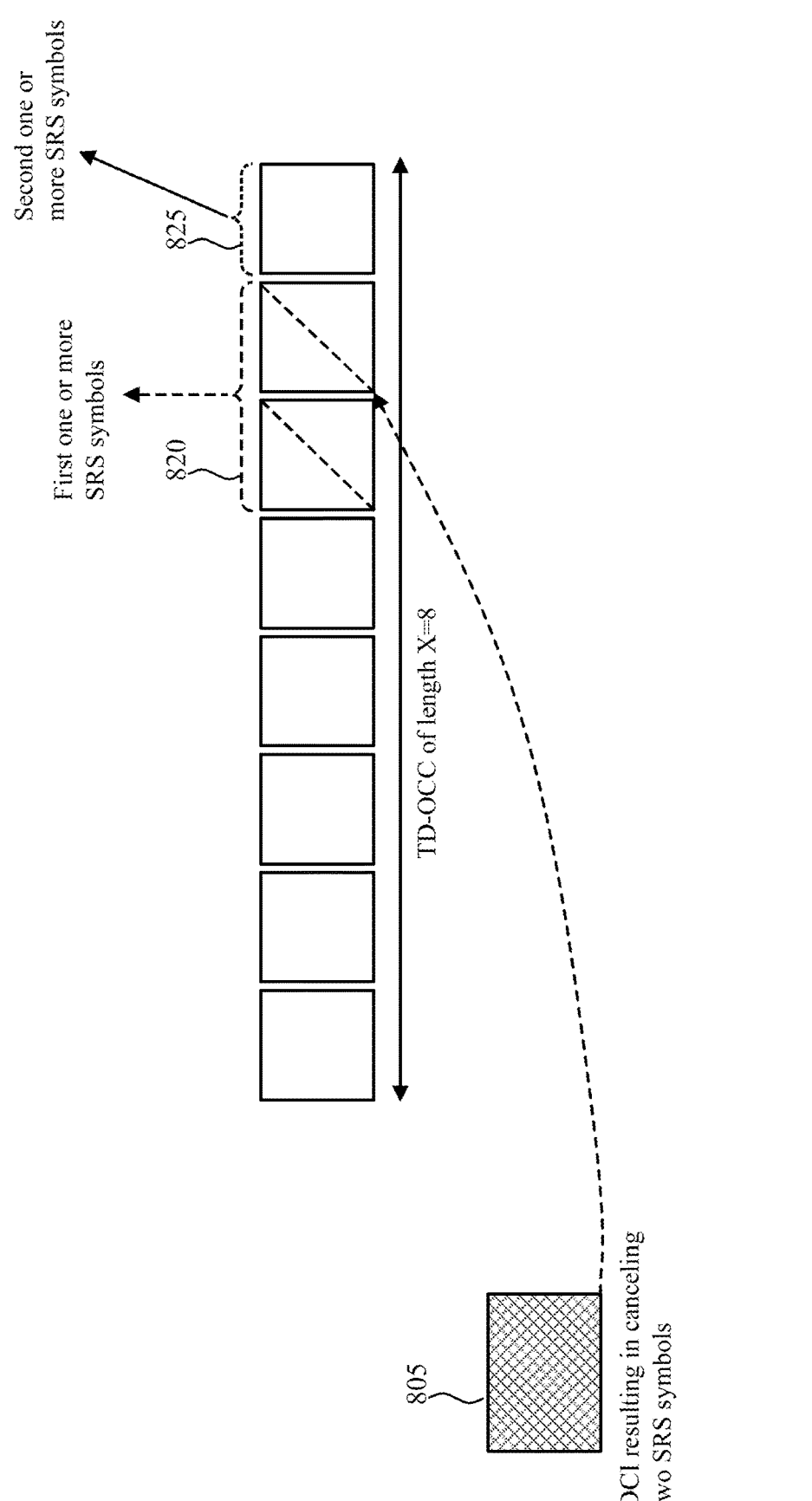
FIG. 8 is another example of timeline that illustrates a UE receiving a DCI at a first time period that may result in cancellation of one or more SRS symbols from the TD-OCC SRS symbols.

FIG. 8 is an example of timeline 800 of one example of UE 104 resolving the cancellation of one or more SRS symbols within the timeline. Particularly, when TD-OCC of length X (e.g., X=8) is applied to an SRS resource and detection of DCI 805 results in cancellation of first one or more SRS symbols 820 from the X symbols, the UE 104 may determine to also cancel a second set of one or more symbols 825 that are a candidate for cancellation. In one example, the one or more SRS symbols 825 that follow the first one or more SRS symbols 820 that are impacted by the DCI are also canceled. In this case, there may not be a need to consider additional timeline because the second one or more SRS symbols 825 may come after the first one or more SRS symbols, and the procedures configured for the UE 104 may ensure that there is sufficient time for the UE 104 to cancel the both the first one or more symbols 820 and the second one or more symbols 825 such that there is no loss of orthogonalization on the remaining symbols in the SRS transmission.

Figure 9:
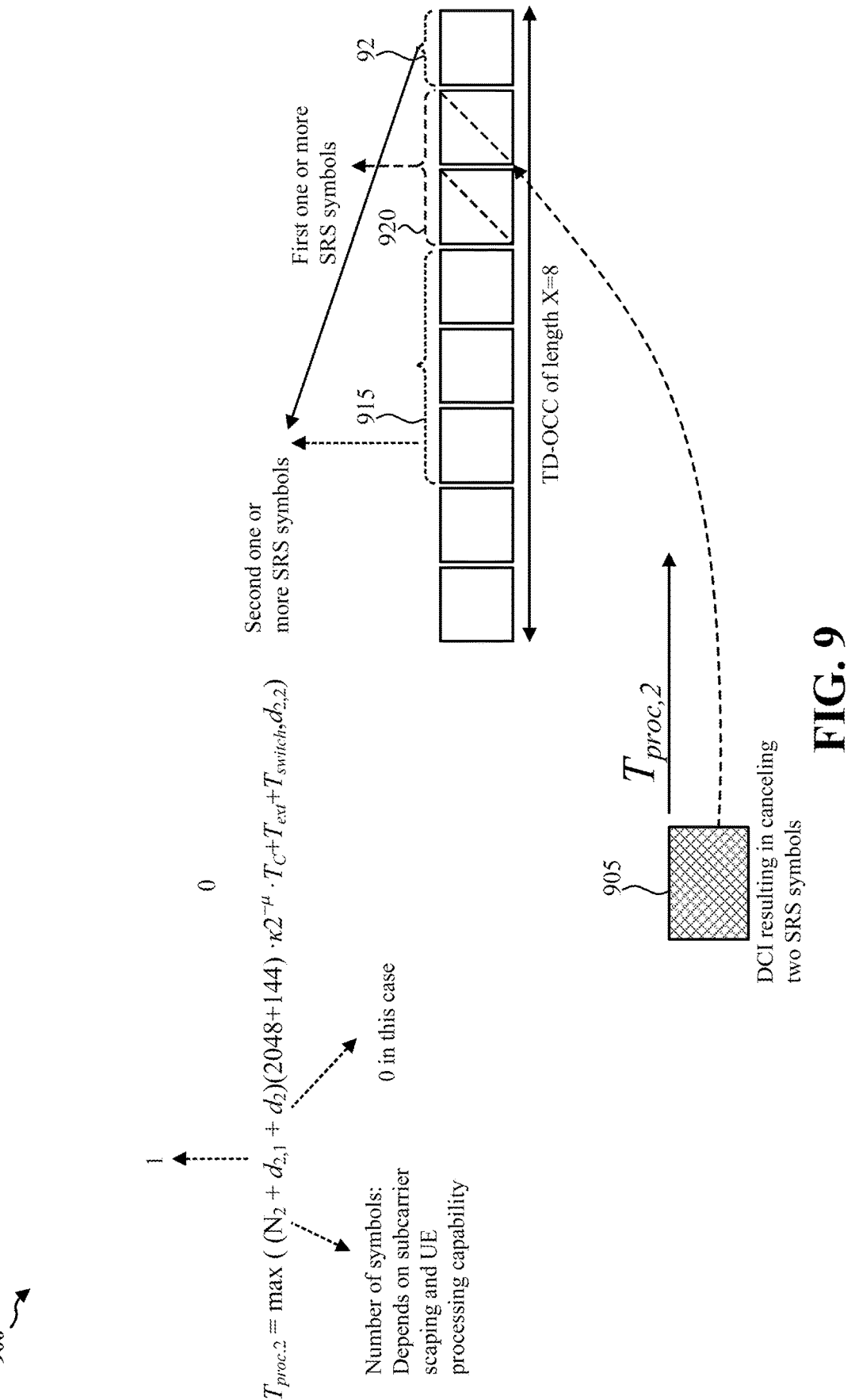
FIG. 9 is another example of timeline that illustrates a UE receiving a DCI at a first time period that may result in cancellation of one or more SRS symbols from the TD-OCC SRS symbols.

In another example, as shown in FIG. 9, the UE 104 may determine to cancel at least portion of the first candidate of SRS symbols 915 for cancellation that precede and a second candidate of SRS symbols 925 (collectively "second one or more SRS symbols") that follow the first one or more SRS symbols 920 that the UE 104 identifies would be canceled due to the DCI. In this example, the second one or more SRS symbols may be symbols that occur after $T_{prox,2}$ relative to a last symbol of a CORESET where the UE detects the DCI format. $T_{prox,2}$ may be the PUSCH preparation time for the corresponding UE processing capability according to the equation shown in FIG. 9.

Figure 10:
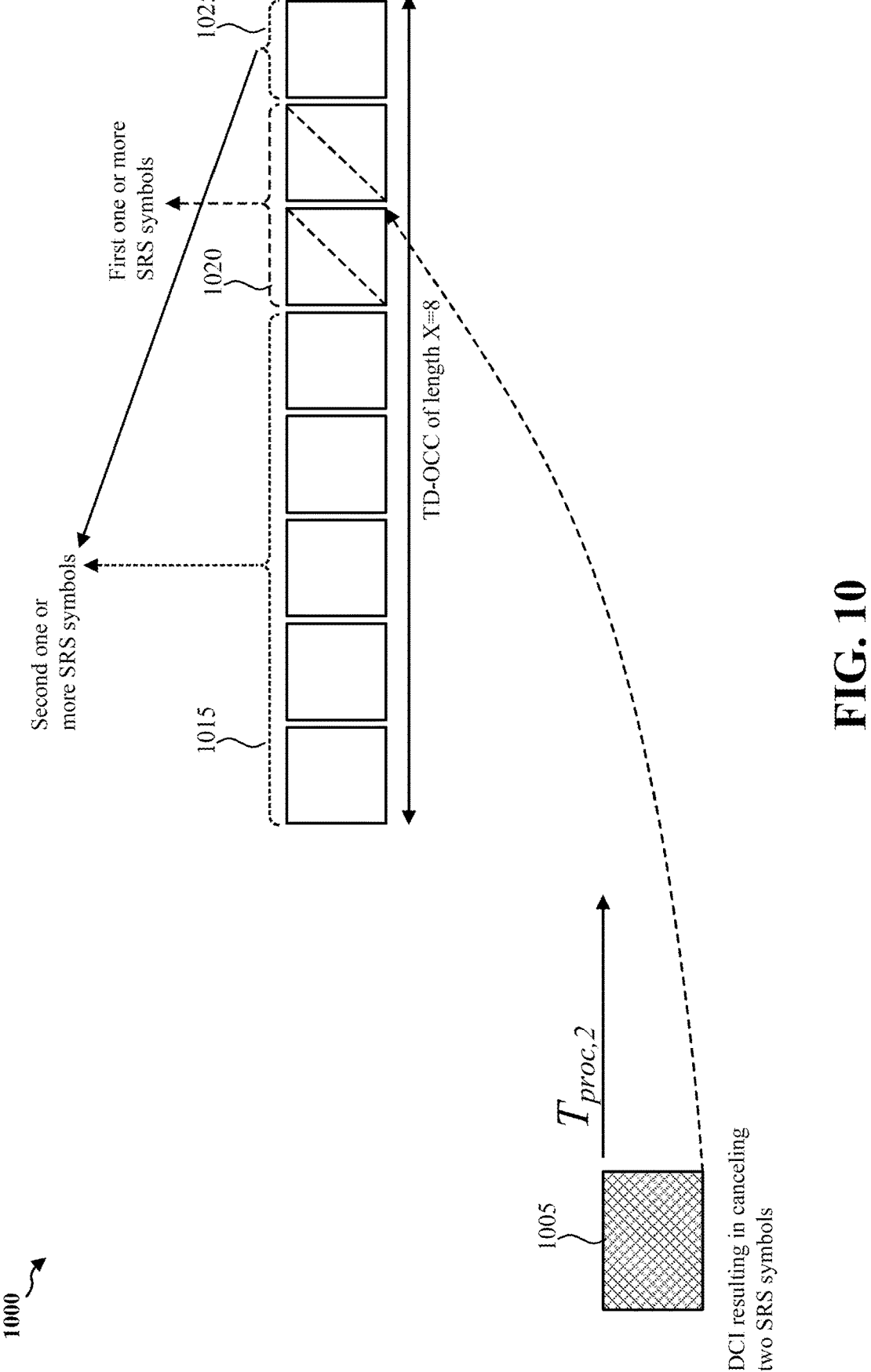
FIG. 10 is another example of timeline that illustrates a UE receiving a DCI at a first time period that may result in cancellation of one or more SRS symbols from the TD-OCC SRS symbols.

In another example, as shown in the timeline 1000 of FIG. 10, the second one or more SRS symbols may include all other SRS symbols (e.g., UE may cancel the entire block of X symbols. In such instance, the UE may not expect the first symbol of the TD-OCC block to occur within $T_{proc,2}$ relative to a last symbol of a CORESET where the UE detects the DCI format. In other words, the network entity may withhold from transmitting any DCI 1005 that may impact transmission of SRS symbols within a certain time period of transmission of the start of TD-OCC transmission such that the UE 104 is unable to decode the DCI 1005 in sufficient time before the first one or more SRS symbols are transmitted. Thus, such example ensures that once the UE 104 detects that at least one or more SRS symbols 1020 may be impacted by the DCI 1005, the UE 104 may preemptively determine to cancel transmission of all the SRS symbols of the TD-OCC of length X, including SRS symbols 1015, 1020, and 1025 in order ensure there is no loss of orthogonalization on the symbols in the SRS.

As noted above, the UE 104 may cancel the one or more SRS symbols in each of the above examples because the orthogonality of SRS provided by TD-OCC may be lost if the first one or more SRS symbols are canceled. However, if the ratio of dropped SRS symbols to the ratio of X (TD-OCC length) is small, the loss of orthogonality may also be small. On the other hand, if the ratio of dropped SRS symbols is large, the loss of orthogonality becomes large as well. In other words, the ratio of dropped SRS symbols and loss of orthogonality may be directly proportional.

Thus, if all SRS symbols of the X symbols occur after $T_{proc,2}$ relative to a last symbol of a CORESET where the UE detects the DCI format, the UE may determine to drop each of the SRS symbols. However, in other instances, the UE may drop the first one or more SRS symbols that are canceled by the DCI, but no second one or more SRS symbols. In such instance, the UE determines that if all SRS symbols cannot be dropped, the UE endeavors to drop as few of the SRS symbols as possible from the X TD-OCC length.

In another instance, if the number of the first one or more symbols is relatively small (e.g., defined by a threshold with respect to ratio of dropped SRS symbols) than X number of TD-OCC length, the UE may determine to drop the first one or more symbols that are canceled by the DCI, but not second one or more SRS symbols. In such instance, the UE may base its decision on the fact that if the loss of orthogonality is small enough, the preference may be to not drop additional SRS symbols. However, in either instance, the UE 104 may be configured to maintain phase continuity between transmitted SRS symbols. Maintaining phase continuity may be challenging if the transmitted SRS symbols are not contiguous (e.g., the first one or more SRS symbols are in the middle of the timeline).

Thus, under such scenario, the UE 104 may continue to transmit the SRS symbols while canceling as minimal number of SRS symbols as needed in response to the DCI symbol if, for example, the first one or more symbols are contiguous and are either in the beginning or at the end of the block of X symbols. In such instance, the UE may be configured to cancel as small a number of SRS symbols that minimizes orthogonality loss while maintaining phase continuity. In other instance, the UE may be configured to maintain phase continuity for transmission for non-contiguous SRS symbols after excluding the first one or more SRS symbols. In such instance, the UE 104 may transmit the one or more second SRS symbols even if they are noncontiguous. In some instances, the UE may indicate to the network entity which option(s) the UE may support through UE capability signaling, and the network may configure one or the options.

And while the above examples have focused on detection of DCI as triggering UE 104 canceling one or more SRS symbols in TD-OCC, in some cases, the failure to detect a DCI format may also result in a dynamic event that results in canceling the first one or more SRS symbols. For example, in some cases, the first one or more SRS symbols may be configured by higher layers (e.g., RRC) as "flexible," and the UE may be configured by the RRC to monitor SFI DCI format (DCI format 2_0). However, the UE may not detect a DCI format 2_0 providing a slot format for the slot of the first one or more SRS symbols. In such instance, the timeline condition $T_{proc,2}$ relative to a last symbol of a CORESET where the UE detects the DCI format may be replaced with $T_{proc,2}$ relative to a last symbol of a CORESET where the UE is configured to monitor PDCCH for DCI format 2_0. In such case, the failure to detect the DCI may also result in the cancellation of the first one or more SRS symbols.

Figure 11:
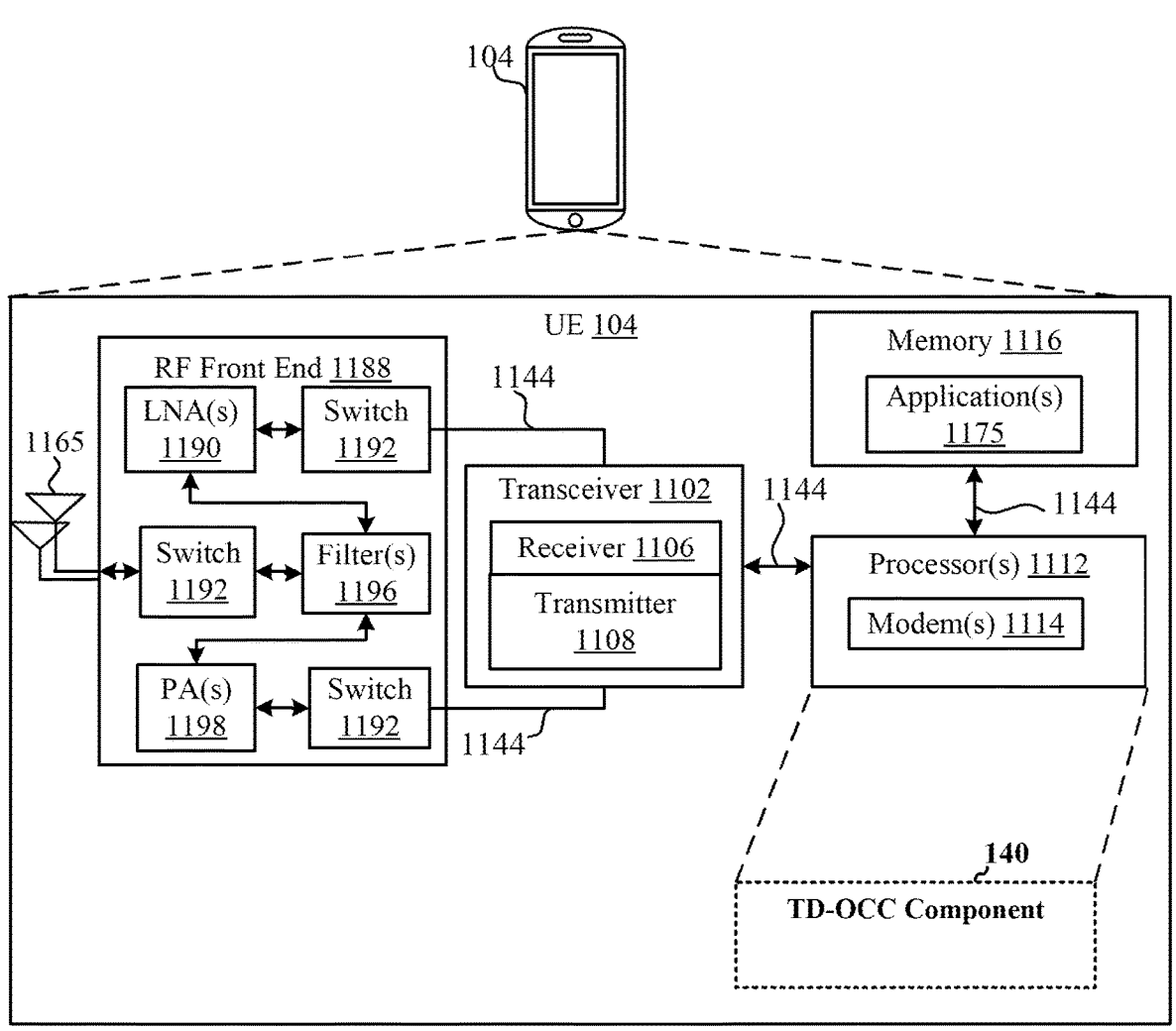
FIG. 11 is a schematic diagram of example components of the UE of FIG. 1.

Referring to FIG. 11, one example of an implementation of UE 104 may include a variety of components, some of which have already been described above, but including components such as one or more processors 1112 and memory 1116 and transceiver 1102 in communication via one or more buses 1144, which may operate in conjunction with modem 1114, and TD-OCC component 140 to enable one or more of the functions described herein related to management of SRS symbol transmissions for TD-OCC. Further, the one or more processors 1112, modem 1114, memory 1116, transceiver 1102, RF front end 1188 and one or more antennas 1165 may be configured to support voice and/or data calls (simultaneously or non-simultaneously) in one or more radio access technologies. The antennas 1165 may include one or more antennas, antenna elements, and/or antenna arrays.

In an aspect, the one or more processors 1112 may include a modem 1114 that uses one or more modem processors. The various functions related to TD-OCC component 140 may be included in modem 1114 and/or processors 1112 and, in an aspect, may be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1114 associated with TD-OCC component 140 may be performed by transceiver 1102.

Also, memory 1116 may be configured to store data used herein and/or local versions of applications 1175, TD-OCC component 140 and/or one or more of subcomponents thereof being executed by at least one processor 1112. Memory 1116 may include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining localized multi-TRP CSI reporting component 140 and/or one or more of subcomponents thereof, and/or data associated therewith, when UE 104 is operating at least one processor 1112 to execute TD-OCC component 140 and/or one or more subcomponents thereof.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. RF front end 1188 may be connected to one or more antennas 1165 and may include one or more low-noise amplifiers (LNAs) 1190, one or more switches 1192, one or more power amplifiers (PAs) 1198, and one or more filters 1196 for transmitting and receiving RF signals.

In an aspect, LNA 1190 may amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 may be used by RF front end 1188 to filter a received signal to obtain an input RF signal. Similarly, in an aspect, for example, a respective filter 1196 may be used to filter an output from a respective PA 1198 to produce an output signal for transmission. In an aspect, each filter 1196 may be connected to a specific LNA 1190 and/or PA 1198. In an aspect, RF front end 1188 may use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver 1102 may be tuned to operate at specified frequencies such that UE 104 can communicate with, for example, one or more base stations 102 or one or more cells associated with one or more base stations 102. In an aspect, for example, modem 1114 may configure transceiver 1102 to operate at a specified frequency and power level based on the UE configuration of the UE 104 and the communication protocol used by modem 1114.

In an aspect, modem 1114 may be a multiband-multimode modem, which can process digital data and communicate with transceiver 1102 such that the digital data is sent and received using transceiver 1102. In an aspect, modem 1114 may be multiband and be configured to support multiple frequency bands for a specific communications protocol. In an aspect, modem 1114 may be multimode and be configured to support multiple operating networks and communications protocols. In an aspect, modem 1114 may control one or more components of UE 104 (e.g., RF front end 1188, transceiver 1102) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

FIG. 12 is a flowchart of a method 1200 of wireless communication that may be performed by a UE (e.g., the UE 104, which may include the memory 360 and which may be the entire UE 104 or a component of the UE 104 such as the localized multi-TRP CSI reporting component 140, TX processor 368, the RX processor 356, and/or the controller/processor 359) for resolving SRS transmission for TD-OCC upon detection of DCI that impacts one or more symbols of the set of symbols for SRS. The method 1200 may be performed by the UE 104 including the TD-OCC component 140.

In block 1205, the method 1200 may include detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period. In an aspect, for example, the UE 104, the Rx processor 356, the controller/processor 359, and/or the processor 1112 may execute the TD-OCC component 140 may perform the method 1205. Accordingly, the UE 104, the Rx processor 356, the controller/processor 359, and/or the processor 1112 executing the TD-OCC component 140 may provide means for detecting, at a user equipment (UE), a downlink control information (DCI) message from a network entity during a first time period.

In block 1210, the method 1200 may include modifying transmission of a second subset of one or more symbols of the set of symbols for the SRS transmission having the TD-OCC during the second time period based on identification that the DCI message results in dropping the first subset of one or more symbols of the set of symbols for the SRS transmissions. In an aspect, for example, the UE 104, the controller/processor 359, and/or the processor 1112 may execute the TD-OCC component 140 may perform the method 1210. Accordingly, the UE 104, the controller/processor 359, and/or the processor 1112 may execute the TD-OCC component 140 may provide means for modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

In some examples, the second subset of the one or more symbols of the set of symbols may include a first group of one or more symbols for SRS transmission and a second group of one or more symbols for SRS transmission. The first group of one or more symbols may precede and the second group of one or more symbols may follow in the time domain the first subset of one or more symbols of the set of symbols for SRS transmission that are impacted by the DCI message. In such instance, modifying the transmission of the second subset of one or more symbols of the set of symbols for the SRS transmission having the TD-OCC during the second time period based on identification that the DCI message results in dropping the first subset of one or more symbols of the set of symbols for the SRS transmissions may comprise transmitting the first group of one or more symbols for SRS transmission and cancelling the second group of one or more symbols for SRS transmission.

In other examples, the method may include transmitting a first portion of the first group of one or more symbols for SRS transmission, cancelling a second portion of the first group of one or more symbols for SRS transmission, and cancelling the second group of one or more symbols for SRS transmission.

In some aspects, the UE may decode the DCI message detected at the UE prior to start of transmission of the one or more symbols of the set of symbols for the SRS transmission having the TD-OCC during a second time period. In such instance, the method may include cancelling transmission of all of the one or more symbols of the set of symbols for the SRS transmission based on identification that the DCI message results in dropping the first subset of one or more symbols of the set of symbols for the SRS transmissions.

In other examples, the UE may decode the DCI message detected at the UE after start of transmission of the one or more symbols of the set of symbols for the SRS transmission having the TD-OCC during a second time period. The method may include canceling transmission of the first subset of one or more symbols for SRS during the second time period and transmitting the second subset of one or more symbols of the set of symbols for the SRS transmission during the second time period.

In some examples, modifying the transmission of the second subset of one or more symbols of the set of symbols for the SRS transmission having the TD-OCC during the second time period based on identification that the DCI message results in dropping the first subset of one or more symbols of the set of symbols for the SRS transmissions may comprise determining that the first subset of one or more symbols for SRS transmission that are impacted by the DCI in relation to the set of symbols for the SRS transmission is less than an orthogonality loss threshold. The method may further include canceling transmission of the first subset of one or more symbols for SRS during the second time period, and transmitting the second subset of one or more symbols of the set of symbols for the SRS transmission during the second time period. In some aspects, the first subset of one or more symbols for SRS transmission may be contiguous at either beginning or at end of the set of symbols for the SRS transmissions. In other instances, the UE may be configured to maintain phase continuity for transmission of non-contiguous SRS symbols while transmitting the second subset of one or more symbols.

FIG. 13 is a flowchart of a method 1300 of wireless communication that may be performed by a UE (e.g., the UE 104, which may include the memory 360 and which may be the entire UE 104 or a component of the UE 104 such as the localized multi-TRP CSI reporting component 140, TX processor 368, the RX processor 356, and/or the controller/processor 359) for resolving SRS transmission for TD-OCC upon detection of DCI that impacts one or more symbols of the set of symbols for SRS. The method 1200 may be performed by the UE 104 including the TD-OCC component 140.

In block 1305, the method 1300 may include monitoring, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC). In an aspect, for example, the UE 104, the Rx processor 356, the controller/processor 359, and/or the processor 1112 may execute the TD-OCC component 140 may perform the method 1305. Accordingly, the UE 104, the Rx processor 356, the controller/processor 359, and/or the processor 1112 executing the TD-OCC component 140 may provide means for monitoring, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC).

In block 1310, the method 1300 may include canceling transmission of the SRS over the one or more symbols based on a failure to detect the DCI message. In an aspect, for example, the UE 104, the Rx processor 356, the controller/processor 359, and/or the processor 1112 may execute the TD-OCC component 140 may perform the method 1310. Accordingly, the UE 104, the Rx processor 356, the controller/processor 359, and/or the processor 1112 executing the TD-OCC component 140 may provide means for canceling transmission of the SRS over the one or more symbols based on a failure to detect the DCI message.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some Further Example Clauses

Implementation examples are described in the following numbered clauses:

1. A method for wireless communications, comprising:
   detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period; and
   modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

2. The method of clause 1, wherein the second subset of the one or more symbols of the set of symbols includes a first group of one or more symbols for SRS transmission and a second group of one or more symbols for SRS transmission, and
   wherein the first group of one or more symbols precedes and the second group of one or more symbols follows in the time domain the first subset of one or more symbols of the set of symbols for SRS transmission that are impacted by the DCI message.

3. The method of clause 1 or 2, wherein modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:
   transmitting the first group of one or more symbols for SRS transmission; and
   cancelling the second group of one or more symbols for SRS transmission.

4. The method of any of the preceding clauses, wherein modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:
   transmitting a first portion of the first group of one or more symbols for SRS transmission;
   cancelling a second portion of the first group of one or more symbols for SRS transmission; and
   cancelling the second group of one or more symbols for SRS transmission.

5. The method of any of the preceding clauses, wherein the UE decodes the DCI message detected at the UE prior to start of transmission of the one or more symbols of the set of symbols for the SRS transmission having the TD-OCC during a second time period; and
   wherein the method further comprising:
   cancelling transmission of all of the one or more symbols of the set of symbols for the SRS transmission based on identification that the DCI message results in dropping the first subset of one or more symbols of the set of symbols for the SRS transmissions.

6. The method of any of the preceding clauses, wherein the UE decodes the DCI message detected at the UE after start of transmission of the one or more symbols of the set of symbols for the SRS transmission having the TD-OCC during a second time period; and
   wherein the method further comprising:
   canceling transmission of the first subset of one or more symbols for SRS during the second time period; and
   transmitting the second subset of one or more symbols of the set of symbols for the SRS transmission during the second time period.

7. The method of any of the preceding clauses, wherein modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:
   determining that the first subset of one or more symbols for SRS transmission that are impacted by the DCI in relation to the set of symbols for the SRS transmission is less than an orthogonality loss threshold;
   canceling transmission of the first subset of one or more symbols for SRS during the second time period; and
   transmitting the second subset of one or more symbols of the set of symbols for the SRS transmission during the second time period.

8. The method of any of the preceding clauses, wherein the first subset of one or more symbols for SRS transmission are contiguous at either beginning or at end of the set of symbols for the SRS transmissions.

9. The method of any of the preceding clauses, wherein the UE is further configured to maintain phase continuity for transmission of non-contiguous SRS symbols while transmitting the second subset of one or more symbols.

10. An apparatus for wireless communication, comprising:
    one or more a memories; and
    one or more processors, individually or in combination, coupled with the one or more memories and configured to:
    detect, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period; and
    modify transmission of a second subset of one or more symbols of the set of symbols for the SRS transmission having the TD-OCC during the second time period based on identification that the DCI message results in dropping the first subset of one or more symbols of the set of symbols for the SRS transmissions.

11. The apparatus of clause 10, wherein the second subset of the one or more symbols of the set of symbols includes a first group of one or more symbols for SRS transmission and a second group of one or more symbols for SRS transmission, and wherein the first group of one or more symbols precedes and the second group of one or more symbols follows in the time domain the first subset of one or more symbols of the set of symbols for SRS transmission that are impacted by the DCI message.

12 The apparatus of clause 10 or 11, wherein the one or more processors configured to modify the transmission of the second subset of one or more symbols of the set of symbols for the SRS transmission having the TD-OCC during the second time period based on identification that the DCI message results in dropping the first subset of one or more symbols of the set of symbols for the SRS transmissions are further configured to:

transmit the first group of one or more symbols for SRS transmission; and cancel the second group of one or more symbols for SRS transmission.

13. The apparatus of any of the preceding clauses, wherein the one or more processors configured to modify the transmission of the second subset of one or more symbols of the set of symbols for the SRS transmission having the TD-OCC during the second time period based on identification that the DCI message results in dropping the first subset of one or more symbols of the set of symbols for the SRS transmissions are further configured to:

transmit a first portion of the first group of one or more symbols for SRS transmission;

cancel a second portion of the first group of one or more symbols for SRS transmission; and cancel the second group of one or more symbols for SRS transmission.

14. Thus apparatus of any of the preceding clauses, wherein the UE decodes the DCI message detected at the UE prior to start of transmission of the one or more symbols of the set of symbols for the SRS transmission having the TD-OCC during a second time period; and wherein the one or more processors are further configured to:

cancel transmission of all of the one or more symbols of the set of symbols for the SRS transmission based on identification that the DCI message results in dropping the first subset of one or more symbols of the set of symbols for the SRS transmissions.

15. The apparatus of any of the preceding clauses, wherein the UE decodes the DCI message detected at the UE after start of transmission of the one or more symbols of the set of symbols for the SRS transmission having the TD-OCC during a second time period; and wherein the one or more processors are further configured to:

cancel transmission of the first subset of one or more symbols for SRS during the second time period; and transmit the second subset of one or more symbols of the set of symbols for the SRS transmission during the second time period.

16. The apparatus of any of the preceding clauses, wherein the one or more processors configured to modify the transmission of the second subset of one or more symbols of the set of symbols for the SRS transmission having the TD-OCC during the second time period based on identification that the DCI message results in dropping the first subset of one or more symbols of the set of symbols for the SRS transmissions are further configured to:

determine that the first subset of one or more symbols for SRS transmission that are impacted by the DCI in relation to the set of symbols for the SRS transmission is less than an orthogonality loss threshold;

cancel transmission of the first subset of one or more symbols for SRS during the second time period; and transmit the second subset of one or more symbols of the set of symbols for the SRS transmission during the second time period.

17. The apparatus of any of the preceding clauses, wherein the first subset of one or more symbols for SRS transmission are contiguous at either beginning or at end of the set of symbols for the SRS transmissions.

18. The apparatus of any of the preceding clauses, wherein the UE is further configured to maintain phase continuity for transmission of non-contiguous SRS symbols while transmitting the second subset of one or more symbols.

19. An apparatus for wireless communication, comprising:

means for detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period; and means for modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

20. A non-transitory computer-readable medium storing computer executable code, the code when executed by a processor causes the processor to:

detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period; and modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

21. A method for wireless communication, comprising:

monitoring, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC); and canceling transmission of the SRS over the one or more symbols based on a failure to detect the DCI message.

22. An apparatus for wireless communication, comprising:

one or more a memories; and one or more processors, individually or in combination, coupled with the one or more memories and configured to:

monitor, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC); and cancel transmission of the SRS over the one or more symbols based on a failure to detect the DCI message.

23. A non-transitory computer-readable medium storing computer executable code, the code when executed by a processor causes the processor to:

monitor, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC); and cancel transmission of the SRS over the one or more symbols based on a failure to detect the DCI message.

24. An apparatus for wireless communication, comprising:

means for monitoring, during a first time period, a wireless channel for a downlink control information (DCI) message that includes a slot format indicator (SFI) associated with one or more symbols that a user equipment (UE) is configured to use during a second time period for a sounding reference signal (SRS) transmission having a time domain orthogonal cover code (TD-OCC); and means for canceling transmission of the SRS over the one or more symbols based on a failure to detect the DCI message.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communications, comprising:

detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period; and modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

2. The method of claim 1, wherein the second subset of the one or more symbols of the set of symbols includes a first group of one or more symbols for SRS transmission and a second group of one or more symbols for SRS transmission, and wherein the first group of one or more symbols precedes and the second group of one or more symbols follows in the time domain the first subset of one or more symbols of the set of symbols for SRS transmission that are impacted by the DCI message.

3. The method of claim 2, wherein modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:

transmitting the first group of one or more symbols for SRS transmission; and cancelling the second group of one or more symbols for SRS transmission.

4. The method of claim 2, wherein modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:

transmitting a first portion of the first group of one or more symbols for SRS transmission;

cancelling a second portion of the first group of one or more symbols for SRS transmission; and cancelling the second group of one or more symbols for SRS transmission.

5. The method of claim 1, wherein the UE decodes the DCI message detected at the UE prior to start of transmission of the one or more symbols of the set of symbols for the SRS transmission having the TD-OCC during a second time period; and wherein the method further comprising:

cancelling transmission of all of the one or more symbols of the set of symbols for the SRS transmission based on identification that the DCI message results in dropping the first subset of one or more symbols of the set of symbols for the SRS transmissions.

6. The method of claim 1, wherein the UE decodes the DCI message detected at the UE after start of transmission of the one or more symbols of the set of symbols for the SRS transmission having the TD-OCC during a second time period; and wherein the method further comprising:

canceling transmission of the first subset of one or more symbols for SRS during the second time period; and transmitting the second subset of one or more symbols of the set of symbols for the SRS transmission during the second time period.

7. The method of claim 1, wherein modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:

determining that the first subset of one or more symbols for SRS transmission that are impacted by the DCI in relation to the set of symbols for the SRS transmission is less than an orthogonality loss threshold;

canceling transmission of the first subset of one or more symbols for SRS during the second time period; and transmitting the second subset of one or more symbols of the set of symbols for the SRS transmission during the second time period.

8. The method of claim 7, wherein the first subset of one or more symbols for SRS transmission are contiguous at either beginning or at end of the set of symbols for the SRS transmissions.

9. The method of claim 7, wherein the UE is further configured to maintain phase continuity for transmission of non-contiguous SRS symbols while transmitting the second subset of one or more symbols.

10. An apparatus for wireless communication, comprising:

one or more memories; and one or more processors, individually or in combination, coupled with the one or more memories and configured to:

detect, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period; and modify transmission of a second subset of one or more symbols of the set of symbols for the SRS transmission having the TD-OCC during the second time period based on identification that the DCI message results in dropping the first subset of one or more symbols of the set of symbols for the SRS transmissions.

11. The apparatus of claim 10, wherein the second subset of the one or more symbols of the set of symbols includes a first group of one or more symbols for SRS transmission and a second group of one or more symbols for SRS transmission, and wherein the first group of one or more symbols precedes and the second group of one or more symbols follows in the time domain the first subset of one or more symbols of the set of symbols for SRS transmission that are impacted by the DCI message.

12. The apparatus of claim 11, wherein the one or more processors configured to modify the transmission of the second subset of one or more symbols of the set of symbols for the SRS transmission having the TD-OCC during the second time period based on identification that the DCI message results in dropping the first subset of one or more symbols of the set of symbols for the SRS transmissions are further configured to:

transmit the first group of one or more symbols for SRS transmission; and cancel the second group of one or more symbols for SRS transmission.

13. The apparatus of claim 11, wherein the one or more processors configured to modify the transmission of the second subset of one or more symbols of the set of symbols for the SRS transmission having the TD-OCC during the second time period based on identification that the DCI message results in dropping the first subset of one or more symbols of the set of symbols for the SRS transmissions are further configured to:

transmit a first portion of the first group of one or more symbols for SRS transmission;

cancel a second portion of the first group of one or more symbols for SRS transmission; and cancel the second group of one or more symbols for SRS transmission.

14. The apparatus of claim 10, wherein the UE decodes the DCI message detected at the UE prior to start of transmission of the one or more symbols of the set of symbols for the SRS transmission having the TD-OCC during a second time period; and wherein the one or more processors are further configured to:

cancel transmission of all of the one or more symbols of the set of symbols for the SRS transmission based on identification that the DCI message results in dropping the first subset of one or more symbols of the set of symbols for the SRS transmissions.

15. The apparatus of claim 10, wherein the UE decodes the DCI message detected at the UE after start of transmission of the one or more symbols of the set of symbols for the SRS transmission having the TD-OCC during a second time period; and wherein the one or more processors are further configured to:

cancel transmission of the first subset of one or more symbols for SRS during the second time period; and transmit the second subset of one or more symbols of the set of symbols for the SRS transmission during the second time period.

16. The apparatus of claim 10, wherein the one or more processors configured to modify the transmission of the second subset of one or more symbols of the set of symbols for the SRS transmission having the TD-OCC during the second time period based on identification that the DCI message results in dropping the first subset of one or more symbols of the set of symbols for the SRS transmissions are further configured to:

determine that the first subset of one or more symbols for SRS transmission that are impacted by the DCI in relation to the set of symbols for the SRS transmission is less than an orthogonality loss threshold;

cancel transmission of the first subset of one or more symbols for SRS during the second time period; and transmit the second subset of one or more symbols of the set of symbols for the SRS transmission during the second time period.

17. The apparatus of claim 16, wherein the first subset of one or more symbols for SRS transmission are contiguous at either beginning or at end of the set of symbols for the SRS transmissions.

18. The apparatus of claim 16, wherein the UE is further configured to maintain phase continuity for transmission of non-contiguous SRS symbols while transmitting the second subset of one or more symbols.

19. An apparatus for wireless communication, comprising:

means for detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period; and means for modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

20. The apparatus of claim 19, wherein the second subset of the one or more symbols of the set of symbols includes a first group of one or more symbols for SRS transmission and a second group of one or more symbols for SRS transmission, and wherein the first group of one or more symbols precedes and the second group of one or more symbols follows in the time domain the first subset of one or more symbols of the set of symbols for SRS transmission that are impacted by the DCI message.

21. The apparatus of claim 20, wherein the means for modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:

means for transmitting the first group of one or more symbols for SRS transmission; and means for cancelling the second group of one or more symbols for SRS transmission.

22. The apparatus of claim 20, wherein the means for modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:

means for transmitting a first portion of the first group of one or more symbols for SRS transmission;

means for cancelling a second portion of the first group of one or more symbols for SRS transmission; and means for cancelling the second group of one or more symbols for SRS transmission.

23. The apparatus of claim 19, wherein the UE decodes the DCI message detected at the UE prior to start of transmission of the one or more symbols of the set of symbols for the SRS transmission having the TD-OCC during a second time period; and wherein the apparatus further comprising:

means for cancelling transmission of all of the one or more symbols of the set of symbols for the SRS transmission based on identification that the DCI message results in dropping the first subset of one or more symbols of the set of symbols for the SRS transmissions.

24. The apparatus of claim 19, wherein the UE decodes the DCI message detected at the UE after start of transmission of the one or more symbols of the set of symbols for the SRS transmission having the TD-OCC during a second time period; and wherein the apparatus further comprising:

means for canceling transmission of the first subset of one or more symbols for SRS during the second time period; and means for transmitting the second subset of one or more symbols of the set of symbols for the SRS transmission during the second time period.

25. The apparatus of claim 19, wherein the means for modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:

means for determining that the first subset of one or more symbols for SRS transmission that are impacted by the DCI in relation to the set of symbols for the SRS transmission is less than an orthogonality loss threshold;

means for canceling transmission of the first subset of one or more symbols for SRS during the second time period; and means for transmitting the second subset of one or more symbols of the set of symbols for the SRS transmission during the second time period.

26. The apparatus of claim 25, wherein the first subset of one or more symbols for SRS transmission are contiguous at either beginning or at end of the set of symbols for the SRS transmissions.

27. The apparatus of claim 25, wherein the UE is further configured to maintain phase continuity for transmission of non-contiguous SRS symbols while transmitting the second subset of one or more symbols.

28. A non-transitory computer-readable medium storing computer executable code, the code when executed by one or more processors, individually or in combination, causes the one or more processors to:

detecting, at a user equipment (UE), a downlink control information (DCI) message from a network entity during a first time period, wherein the DCI message impacts uplink transmission of a first subset of one or more symbols of a set of symbols for a sounding reference signal (SRS) transmission having a time domain orthogonal cover code (TD-OCC) during a second time period; and modifying transmission of a second subset of one or more symbols of the set of symbols for the SRS transmission having the TD-OCC during the second time period based on identification that the DCI message results in dropping the first subset of one or more symbols of the set of symbols for the SRS transmissions.

29. The non-transitory computer-readable medium of claim 28, wherein the second subset of the one or more symbols of the set of symbols includes a first group of one or more symbols for SRS transmission and a second group of one or more symbols for SRS transmission, and wherein the first group of one or more symbols precedes and the second group of one or more symbols follows in the time domain the first subset of one or more symbols of the set of symbols for SRS transmission that are impacted by the DCI message.

30. The non-transitory computer-readable medium of claim 29, wherein modifying the transmission of the second subset of one or more symbols of the set of symbols for the SRS transmission having the TD-OCC during the second time period based on identification that the DCI message results in dropping the first subset of one or more symbols of the set of symbols for the SRS transmissions comprises:

transmitting the first group of one or more symbols for SRS transmission; and cancelling the second group of one or more symbols for SRS transmission.

\* \* \* \* \*